(12) United States Patent
Nguyen et al.

(10) Patent No.: US 10,377,844 B2
(45) Date of Patent: *Aug. 13, 2019

(54) THERMOASSOCIATIVE AND EXCHANGEABLE COPOLYMERS, AND COMPOSITIONS COMPRISING SAME

(71) Applicants: TOTAL MARKETING SERVICES, Puteaux (FR); ECOLE SUPERIEURE DE PHYSIQUE ET DE CHIMIE INDUSTRIELLES DE LA VILLE DE PARIS (ESPCI), Paris (FR); CENTRE NATIONAL DE LA RECHERCHE SCIENTIFIQUE (CNRS), Paris (FR)

(72) Inventors: Thi Hang Nga Nguyen, Le Kremlin Bicêtre (FR); Renaud Nicolay, Verrières le Buisson (FR); Lise Deves, Bourg-la-Reine (FR)

(73) Assignees: Total Marketing Services, Puteaux (FR); Ecole Superieure De Physique et de Chimie Industrielles De La Ville De Paris (ESPCI), Paris (FR); Centre National De La Recherche Scientifique (CNRS), Paris (FR)

( * ) Notice: Subject to any disclaimer, the term of this patent is extended or adjusted under 35 U.S.C. 154(b) by 98 days.

This patent is subject to a terminal disclaimer.

(21) Appl. No.: 15/114,111

(22) PCT Filed: Jan. 26, 2015

(86) PCT No.: PCT/EP2015/051517
§ 371 (c)(1),
(2) Date: Jul. 26, 2016

(87) PCT Pub. No.: WO2015/110642
PCT Pub. Date: Jul. 30, 2015

(65) Prior Publication Data
US 2017/0008989 A1 Jan. 12, 2017

(30) Foreign Application Priority Data
Jan. 27, 2014 (FR) .................................. 14 50654

(51) Int. Cl.
*C08F 230/06* (2006.01)
*C08L 43/00* (2006.01)
*C10M 145/14* (2006.01)
*C08F 220/20* (2006.01)
*C08L 33/06* (2006.01)
*C10M 157/00* (2006.01)
*C10M 159/00* (2006.01)

(52) U.S. Cl.
CPC .......... *C08F 220/20* (2013.01); *C08F 230/06* (2013.01); *C08L 33/06* (2013.01); *C10M 145/14* (2013.01); *C10M 157/00* (2013.01); *C10M 159/005* (2013.01); *C10M 2205/04* (2013.01); *C10M 2209/04* (2013.01); *C10M 2209/084* (2013.01); *C10N 2230/02* (2013.01)

(58) Field of Classification Search
CPC ... C10M 145/14; C08F 220/20; C08F 230/06; C08L 33/06
USPC .......................................... 524/558; 508/198
See application file for complete search history.

(56) References Cited

U.S. PATENT DOCUMENTS

| | | | | |
|---|---|---|---|---|
| 4,002,699 A | * | 1/1977 | Labana | C09D 133/066 524/512 |
| 4,401,797 A | * | 8/1983 | Gallop | C08F 220/12 351/159.33 |
| 5,370,807 A | * | 12/1994 | Gambini | C08F 230/06 508/198 |
| 5,523,354 A | * | 6/1996 | Kaufmann | C08F 8/14 525/206 |

FOREIGN PATENT DOCUMENTS

WO  WO-2013147795 A1  10/2013

* cited by examiner

*Primary Examiner* — Kelechi C Egwim
(74) *Attorney, Agent, or Firm* — Harness, Dickey & Pierce, PLC

(57) ABSTRACT

A composition results from the mixture of at least one copolymer A resulting from the copolymerization of at least one monomer functionalized by diol functions and at least one compound A2 comprising at last two boronic ester functions. They have rheological properties which are very varied according to the proportion of the A1 and A2 compounds used. The field is that of associative and exchangeable polymers.

20 Claims, 9 Drawing Sheets

THERMOASSOCIATIVE AND EXCHANGEABLE COPOLYMERS, AND COMPOSITIONS COMPRISING SAME

CROSS-REFERENCE TO RELATED APPLICATIONS

This application is a National Phase Entry of International Patent Application No. PCT/EP2015/051517, filed on Jan. 26, 2015, which claims priority to French Patent Application Serial No. 1450654, filed on Jan. 27, 2014, both of which are incorporated by reference herein.

TECHNICAL FIELD

The invention relates to a composition resulting from mixing at least one copolymer A1 resulting from the copolymerization of at least one monomer functionalized by diol functions and at least one compound A2 comprising at least two boronic ester functions. They have very varied rheological properties depending on the proportion of compounds A1 and A2 used. The field of the invention is that of associative and exchangeable polymers.

BACKGROUND

High molecular weight polymers are widely used for increasing the viscosity of solutions in numerous fields, such as the oil and paper industries, water treatment, the mining, cosmetics and textile industries and generally in all the industrial techniques using thickened solutions. Now, these high molecular weight polymers have the drawback of having a low permanent shear strength with respect to the same polymers of smaller size. These shearing constraints on the high molecular weight polymers lead to macromolecular chain cleavages. The polymer thus degraded no longer has thickening properties, and the viscosity of the solutions containing it drops irreversibly. This loss of permanent shear strength leads to a degradation of the properties of the solutions based on high molecular weight polymers.

The Applicant set himself the objective of the formulation of novel additives which would be more stable under shearing compared to the compounds of the prior art. This objective is achieved thanks to novel additives which are associative and exchangeable in a thermoreversible manner. The associated (potentially cross-linked) and exchangeable copolymers of the invention have the advantage of being more stable to shear stresses. This characteristic results from the combined use of two particular compounds, a statistical copolymer bearing diol functions and a compound comprising at least two boronic ester functions.

Polymers, of which at least one monomer comprises boronic ester functions are known from document WO2013147795. These polymers are used for the production of electronic devices, in particular for devices in which it is desired to obtain a flexible user interface. These polymers are also used as synthesis intermediates. They allow the functionalization of the polymers by coupling with luminescent groups, electron-transporter groups, etc. The coupling of these groups is carried out by standard organic chemistry reactions, involving the boron atom, such as for example Suzuki coupling. However, no other use of these polymers, nor an association with other compounds is envisaged.

A copolymer resulting from the copolymerization of a methyl methacrylate (MMA) monomer and a glyceryl methacrylate monomer optionally protected by a boronic ester (namely butyl boronic acid adduct of glyceryl methacrylate (BBA-GMA)) is known from document U.S. Pat. No. 4,401,797. This copolymer forms a hydrogel in the presence of water and is used for the production of contact lenses. However, no other use of this copolymer in the field of lubricating compositions, nor an association via exchangeable chemical bonds with other compounds is envisaged.

Document EP0570073 discloses an additive which improves the viscosity index of a lubricating composition in which it is added. This additive is a copolymer resulting from the polymerization of 1-(methacryloylethoxy)-4,4,6-trimethyl-dioxaborinane and a methacrylate of a linear ($C_{12}$-$C_{18}$) alkyl. This additive belongs to the family of the borate compounds which can be represented by the general formula $B(OR)_3$ with R an alkyl or aryl group. This additive does not belong to the family of the boronate compounds which can be represented by the general formula $R-B(OR)_2$ with R an alkyl or aryl group. This additive cannot be associated with other compounds via exchangeable chemical bonds.

The Applicant also set himself the objective of the synthesis of novel polymers making it possible to increase the viscosity of solutions comprising them compared with the polymers of the prior art. In particular, his objective is to provide novel rheological additives the behaviour of which, when they are introduced into a solution, in particular into a hydrophobic solution, is opposite as regards temperature change compared with the behaviour of the solution and the polymer-type rheological additives of the prior art. This objective is achieved thanks to novel rheological additives capable of associating, in order to possibly form a gel, and exchanging chemical bonds in a thermoreversible manner. The additives of the present invention have the advantage of increasing the viscosity of the solution comprising them when the temperature increases.

Firstly, the Applicant attempted to synthesize copolymers bearing diol functions from commercial compounds such as solketal methacrylate marketed by Sigma-Aldrich®. However, the use of this monomer presents several drawbacks:
  its purchase price is high;
  the polarity of the solketal methacrylate and 2,3-dihydroxypropyl methacrylate units (resulting from the deprotection of the solketal function) limits the solubility of the copolymers in apolar mediums;
  the pendant diol function is difficult to access on the copolymers;
  depending on the nature of the copolymer, deprotection of the monomer once polymerized can be difficult and/or lead to the formation of gels.

Thus, the Applicant also set himself the objective of the synthesis of novel statistical copolymers bearing diol functions which overcome the drawbacks mentioned above. This objective is achieved thanks to the novel polydiol statistical copolymers A1 comprising at least one monomer M1 of general formula (I) as described hereafter. The polydiol statistical copolymers A1 of the invention have in particular the following advantages:
  deprotection of the protected diol functions once polymerized is simpler due to their greater accessibility;
  they are more easily soluble in an apolar medium;
  these polymers are adaptive, i.e. they are capable of responding to an external stimulus by a change of properties;
  they can associate and exchange in a thermoreversible manner with compounds having at least two boronic ester functions, in particular in an apolar medium, for example.

Secondly, the Applicant attempted to synthesize compounds bearing at least two boronic ester functions from commercial compounds such as 4-vinylphenylboronic acid marketed by Sigma-Aldrich®. However, the use of this compound presents several drawbacks:

- the polymerization of these monomers in a hydrophobic medium leads to the formation of gels which are not compatible with the desired use;
- the copolymers containing acid 4-vinylphenylboronic functions are not temperature stable in a hydrophobic medium and lead to the formation of gels.

Thus, the Applicant also set himself the objective of the synthesis of novel compounds bearing at least two boronic ester functions which overcome the drawbacks mentioned above. This objective is achieved thanks to the novel compounds having at least two boronic ester functions of general formula (III), or comprising at least one monomer M3 of general formula (IV), as described hereafter. The compounds of the invention having at least two boronic ester functions have in particular the following advantages:

- their syntheses are simple and inexpensive;
- they are soluble in a hydrophobic medium, in particular in an apolar hydrophobic medium;
- they do not form a gel during polymerization;
- they are temperature stable in a hydrophobic medium and do not lead to the formation of gels.

SUMMARY

Thus, a subject of the invention is a composition resulting from mixing at least:

a statistical copolymer A1 resulting from the copolymerization:
of at least one first monomer M1 of general formula (I):

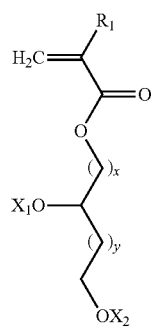

in which:
R$_1$ is selected from the group formed by —H, —CH$_3$, and —CH$_2$—CH$_3$;
x is an integer ranging from 2 to 18;
y is an integer equal to 0 or 1;
X$_1$ and X$_2$, identical or different, are selected from the group formed by hydrogen, tetrahydropyranyl, methyloxymethyl, ter-butyl, benzyl, trimethylsilyl and t-butyl dimethylsilyl;

or
X$_1$ and X$_2$ form with the oxygen atoms a bridge of the following formula

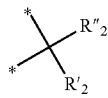

in which:
the stars (*) symbolize the bonds to the oxygen atoms,
R'$_2$ and R"$_2$, identical or different, are selected from the group formed by hydrogen and a C$_1$-C$_{11}$ alkyl, preferably methyl;

or
X$_1$ and X$_2$ form with the oxygen atoms a boronic ester of the following formula

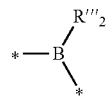

in which:
the stars (*) symbolize the bonds to the oxygen atoms,
R'''$_2$ is selected from the group formed by a C$_6$-C$_{18}$ aryl, a C$_7$-C$_{18}$ aralkyl and C$_2$-C$_{18}$ alkyl, preferably a C$_6$-C$_{18}$ aryl;

with at least one second monomer M2 of general formula (II):

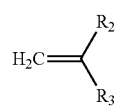

in which:
R$_2$ is selected from the group formed by —H, —CH$_3$ and —CH$_2$—CH$_3$,
R$_3$ is selected from the group formed by a C$_6$-C$_{18}$ aryl, a C$_6$-C$_{18}$ aryl substituted by an R'$_3$, —C(O)—O—R'$_3$, —O—R'$_3$, —S—R'$_3$ and —C(O)—N(H)—R'$_3$ group with R'$_3$ a C$_1$-C$_{30}$ alkyl group; and
a compound A2 comprising at least two boronic ester functions.

In a variant, the statistical copolymer A1 results from the copolymerization of at least one monomer M1 with at least two monomers M2 having different R$_3$ groups. Preferably, one of the monomers M2 has the general formula (II-A):

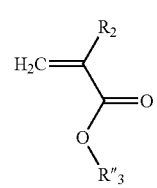

in which
R$_2$ is selected from the group formed by —H, —CH$_3$ and —CH$_2$—CH$_3$;
R"$_3$ is a C$_1$-C$_{14}$ alkyl group;

and the other monomer M2 has the general formula (II-B):

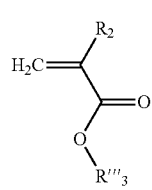

(II-B)

in which:
  $R_2$ is selected from the group formed by —H, —$CH_3$ and —$CH_2$—$CH_3$;
  $R'''_3$ is a $C_{15}$-$C_{30}$ alkyl group.

Preferably, the statistical copolymer A1 described above comprises one or more of the characteristics below, taken separately or in combination:
  the side chains of the copolymer have an average length ranging from 8 to 20 carbon atoms, preferably from 9 to 15 carbon atoms;
  the molar percentage of monomer M1 of formula (I) in said copolymer ranging from 1 to 30%, preferably from 5 to 25%, more preferably ranging from 9 to 21%;
  its number-average degree of polymerization ranges from 100 to 2000, preferably from 150 to 1000;
  its polydispersity index (PDI) ranges from 1.05 to 3.75; preferably ranging from 1.10 to 3.45.

In a variant, the compound A2 is a compound of formula (III):

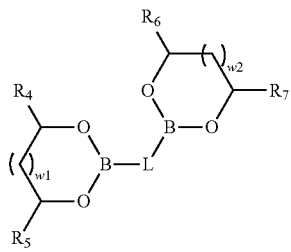

(III)

in which:
  $w_1$ and $w_2$, identical or different are integers selected between 0 and 1;
  $R_4$, $R_5$, $R_6$ and $R_7$, identical or different are selected from the group formed by hydrogen and a hydrocarbon-containing group having from 1 to 24 carbon atoms, preferably between 4 and 18 carbon atoms, preferably between 6 and 14 carbon atoms;
  L is a divalent bond group and selected from the group formed by a $C_6$-$C_{18}$ aryl, a $C_6$-$C_{18}$ aralkyl and a $C_2$-$C_{24}$ hydrocarbon-containing chain.

In another variant, the compound A2 is a statistical copolymer resulting from the copolymerization:

of at least one monomer M3 of formula (IV):

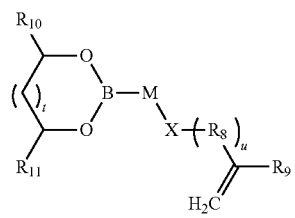

(IV)

in which
  t is an integer equal to 0 or 1;
  u is an integer equal to 0 or 1;
  M and $R_8$ are divalent bond groups, identical or different, selected from the group formed by a $C_6$-$C_{18}$ aryl, a $C_7$-$C_{24}$ aralkyl and a $C_2$-$C_{24}$ alkyl, preferably a $C_6$-$C_{18}$ aryl,
  X is a function selected from the group formed by —O—C(O)—, —C(O)—O—, —C(O)—N(H)—, —N(H)—C(O)—, —S—, —N(H)—, —N($R'_4$)— and —O— with $R'_4$ a hydrocarbon-containing chain comprising from 1 to 15 carbon atoms;
  $R_9$ is selected from the group formed by —H, —$CH_3$ and —$CH_2$—$CH_3$;
  $R_{10}$ and $R_{11}$ identical or different are selected from the group formed by hydrogen and a hydrocarbon-containing group having from 1 to 24 carbon atoms, preferably between 4 and 18 carbon atoms, preferably between 6 and 14 carbon atoms;
with at least one second monomer M4 of general formula (V):

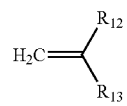

(V)

in which:
  $R_{12}$ is selected from the group formed by —H, —$CH_3$ and —$CH_2$—$CH_3$,
  $R_{13}$ is selected from the group formed by a $C_6$-$C_{18}$ aryl, a $C_6$-$C_{18}$ aryl substituted by an $R'_{13}$, —C(O)—O—$R'_{13}$; —O—$R'_{13}$, —S—$R'_{13}$ and —C(O)—N(H)—$R'_{13}$ group, with $R'_{13}$ a $C_1$-$C_{25}$ alkyl group.

Preferably, the composition described above comprises one or more of the characteristics below, taken separately or in combination:
  the chain formed by the sequence of the $R_{10}$, M, X and $(R_8)_u$ groups with u equal to 0 or 1 of the monomer of general formula (IV) has a total number of carbon atoms ranging from 8 to 38, preferably from 10 to 26;
  the side chains of the copolymer A2 have an average length greater than or equal to 8 carbon atoms, preferably ranging from 11 to 16 carbon atoms;
  the copolymer A2 has a molar percentage of monomer of formula (IV) in said copolymer ranging from 0.25 to 20%, preferably from 1 to 10%;
  the copolymer A2 has a number-average degree of polymerization ranging from 50 to 1500, preferably from 80 to 800;
  the copolymer A2 has a polydispersity index (PDI) ranging from 1.04 to 3.54; preferably ranging from 1.10 to 3.10;

the content of copolymer A1 in the composition ranges from 0.1% to 50% by weight with respect to the total weight of the composition;

the content of compound A2 in the composition ranges from 0.1% to 50% by weight with respect to the total weight of the composition;

the ratio by weight between the copolymer A1 and the compound A2 (ratio A1/A2) ranges from 0.005 to 200, preferably from 0.05 to 20, yet more preferably from 0.1 to 10;

the composition further comprises at least one additive selected from the group formed by the polymers, pigments, dyes, fillers, plasticizers, fibres, antioxidants, additives for lubricants, compatibilizing agents, antifoaming agents, dispersant additives, adhesion promoters and stabilizing agents.

DETAILED DESCRIPTION

A subject of the present invention is a composition of compounds which are associative and exchangeable in a thermoreversible manner, this composition resulting from mixing at least:

a polydiol statistical copolymer A1 as described hereafter or in particular capable of being obtained by one of the processes described hereafter;

a compound A2 comprising at least two boronic ester functions.

Polydiol Statistical Copolymers (Statistical Copolymers A1)

The polydiol statistical copolymer (A1) according to the present invention results from the copolymerization of at least one first monomer M1 bearing diol functions and at least one second monomer M2, of different chemical structure to that of the monomer M1.

By "copolymer", is meant an oligomer or a linear or branched macromolecule having a sequence constituted by several repetitive units (or monomer unit) at least two units of which have a different chemical structure.

By "monomer unit" or "monomer", is meant a molecule capable of being converted to an oligomer or a macromolecule by association with itself or with other molecules of the same type. A monomer denotes the smallest constitutive unit the repetition of which leads to an oligomer or to a macromolecule.

Figure 1:
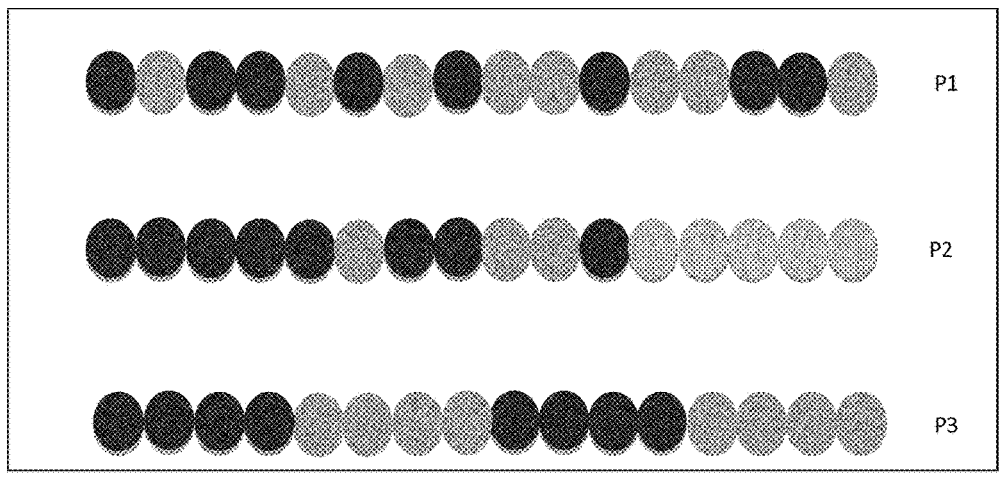
FIG. 1 shows diagrammatically a statistical copolymer (P1), a gradient copolymer (P2) and a block copolymer (P3); each circle shows a monomer unit. The difference in chemical structure between the monomers is symbolized by a different colour (light grey/black).

By "statistical copolymer", is meant an oligomer or a macromolecule in which the sequential distribution of the monomer units obeys known statistical laws. For example, a copolymer is said to be statistical when it is constituted by monomer units the distribution of which is a Markovian distribution. A diagrammatic statistical polymer (P1) is shown in FIG. 1. The distribution in the polymer chain of the monomer units depends on the reactivity of the polymerizable functions of the monomers and on the relative concentration of the monomers. The polydiol statistical copolymers of the invention are distinguished from the block copolymers and from the gradient copolymers. By "block" is meant a part of a copolymer comprising several identical or different monomer units which has at least one feature of its constitution or configuration making it possible to distinguish it from its adjacent parts. A diagrammatic block copolymer (P3) is shown in FIG. 1. A gradient copolymer denotes a copolymer of at least two monomer units of different structures the monomer composition of which changes in a gradual fashion along the polymer chain, thus passing progressively from one end of the polymer chain rich in one monomer unit, to the other end rich in the other comonomer. A diagrammatic gradient polymer (P2) is shown in FIG. 1.

By "copolymerization", is meant a process which allows a mixture of at least two monomer units of different chemical structures to be converted to an oligomer or to a copolymer.

In the remainder of the present application, "B" represents a boron atom.

By "$C_i$-$C_j$ alkyl" is meant a saturated, linear or branched hydrocarbon-containing chain comprising from i to j carbon atoms. For example, by "$C_1$-$C_{10}$ alkyl", is meant a saturated, linear or branched, hydrocarbon-containing chain comprising from 1 to 10 carbon atoms.

By "$C_6$-$C_{18}$ aryl", is meant a functional group which derives from an aromatic hydrocarbon-containing compound comprising from 6 to 18 carbon atoms. This functional group can be monocyclic or polycyclic. By way of illustration, a $C_6$-$C_{18}$ aryl can be phenyl, naphthalene, anthracene, phenanthrene and tetracene.

By "$C_2$-$C_{10}$" alkenyl, is meant a linear or branched hydrocarbon-containing chain comprising at least one unsaturation, preferably a carbon-carbon double bond, and comprising from 2 to 10 carbon atoms.

By "$C_7$-$C_{18}$ aralkyl", is meant an aromatic hydrocarbon-containing compound, preferably monocyclic, substituted by at least one linear or branched alkyl chain and of which the total number of carbon atoms of the aromatic ring and of its substituents ranges from 7 to 18 carbon atoms. By way of illustration a $C_7$-$C_{18}$ aralkyl can be selected from the group formed by benzyl, tolyl and xylyl.

By "$C_6$-$C_{18}$ aryl group substituted by an $R'_3$ group", is meant an aromatic hydrocarbon-containing compound, preferably monocyclic, comprising from 6 to 18 carbon atoms of which at least one carbon atom of the aromatic ring is substituted by an $R'_3$ group.

By "Hal" or "halogen" is meant a halogen atom selected from the group formed by chlorine, bromine, fluorine and iodine.

Monomer M1

The first monomer M1 of the polydiol statistical copolymer (A1) of the invention has the general formula (I):

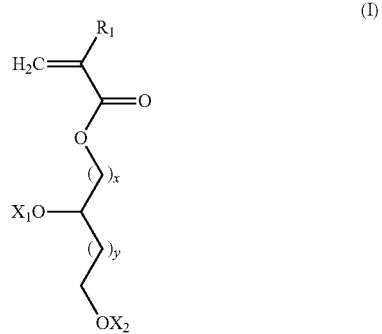

(I)

in which:
$R_1$ is selected from the group formed by —H, —$CH_3$ and —$CH_2$—$CH_3$, preferably —H and —$CH_3$;
x is an integer ranging from 2 to 18; preferably from 3 to 8; more preferably x is equal to 4;
y is an integer equal to 0 or 1; preferably y is equal to 0;
$X_1$ and $X_2$, identical or different, are selected from the group formed by hydrogen, tetrahydropyranyl, methyloxymethyl, ter-butyl, benzyl, trimethylsilyl and t-butyl dimethylsilyl;
or
$X_1$ and $X_2$ form with the oxygen atoms a bridge of the following formula:

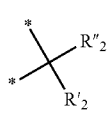

in which
the stars (*) symbolize the bonds to the oxygen atoms,
$R'_2$ and $R''_2$, identical or different, are selected from the group formed by hydrogen and a $C_1$-$C_{11}$ alkyl group;
or
$X_1$ and $X_2$ form with the oxygen atoms a boronic ester of the following formula:

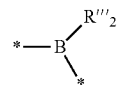

in which:
the stars (*) symbolize the bonds to the oxygen atoms,
$R'''_2$ is selected from the group formed by a $C_6$-$C_{18}$ aryl, a $C_7$-$C_{18}$ aralkyl and a $C_2$-$C_{18}$ alkyl, preferably a $C_6$-$C_{18}$ aryl, more preferably phenyl.

Preferably, when $R'_2$ and $R''_2$ is a $C_1$-$C_{11}$ alkyl group; the hydrocarbon-containing chain is a linear chain. Preferably, the $C_1$-$C_{11}$ alkyl group is selected from the group formed by methyl, ethyl, n-propyl, n-butyl, n-pentyl, n-hexyl, n-heptyl, n-octyl, n-nonyl, n-decycl and n-undecyl. More preferably, the $C_1$-$C_{11}$ alkyl group is methyl. Preferably, when $R'''_2$ is a $C_2$-$C_{18}$ alkyl group; the hydrocarbon-containing chain is a linear chain.

Among the monomers of formula (I), the monomers corresponding to formula (I-A) form part of those preferred:

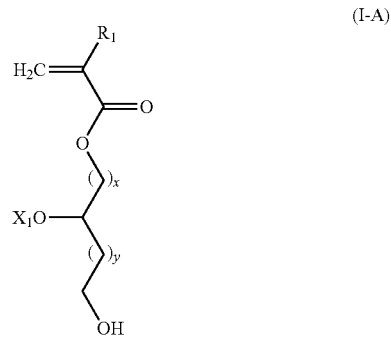

(I-A)

in which:
$R_1$ is selected from the group formed by —H, —$CH_3$ and —$CH_2$—$CH_3$, preferably —H and —$CH_3$;
x is an integer ranging from 2 to 18; preferably from 3 to 8; more preferably x is equal to 4;
y is an integer equal to 0 or 1; preferably y is equal to 0.

Among the monomers of formula (I), the monomers corresponding to formula (I-B) form part of those preferred:

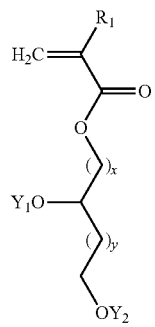

(I-B)

in which
R$_1$ is selected from the group formed by —H, —CH$_3$ and —CH$_2$—CH$_3$, preferably —H and —CH$_3$;
x is an integer ranging from 2 to 18; preferably from 3 to 8; more preferably x is equal to 4;
y is an integer equal to 0 or 1; preferably y is equal to 0;
Y$_1$ and Y$_2$, identical or different, are selected from the group formed by tetrahydropyranyl, methyloxymethyl, ter-butyl, benzyl, trimethylsilyl and t-butyl dimethylsilyl;
or
Y$_1$ and Y$_2$ form with the oxygen atoms a bridge of the following formula:

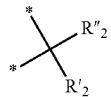

in which:
the stars (*) symbolize the bonds to the oxygen atoms,
R'$_2$ and R"$_2$, identical or different, are selected from the group formed by hydrogen and a C$_1$-C$_{11}$ alkyl group;
or
Y$_1$ and Y$_2$ form with the oxygen atoms a boronic ester of the following formula:

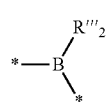

(V)

in which:
the stars (*) symbolize the bonds to the oxygen atoms,
R'''$_2$ is selected from the group formed by a C$_6$-C$_{18}$ aryl, a C$_7$-C$_{18}$ aralkyl and a C$_2$-C$_{18}$ alkyl, preferably a C$_6$-C$_{18}$ aryl, more preferably phenyl.
Preferably, when R'$_2$ and R"$_2$ is a C$_1$-C$_{11}$ alkyl group; the hydrocarbon-containing chain is a linear chain. Preferably, the C$_1$-C$_{11}$ alkyl group is selected from the group formed by methyl, ethyl, n-propyl, n-butyl, n-pentyl, n-hexyl, n-heptyl, n-octyl, n-nonyl, n-decycl and n-undecyl. More preferably, the C$_1$-C$_{11}$ alkyl group is methyl. Preferably, when R'''$_2$ is a C$_2$-C$_{18}$ alkyl group; the hydrocarbon-containing chain is a linear chain.

Obtaining the Monomer M1

The monomer M1 of general formula (I-A) is obtained by deprotection of the alcohol functions of the monomer of general formula (I-B) according to the reaction diagram 1 below:

Diagram 1

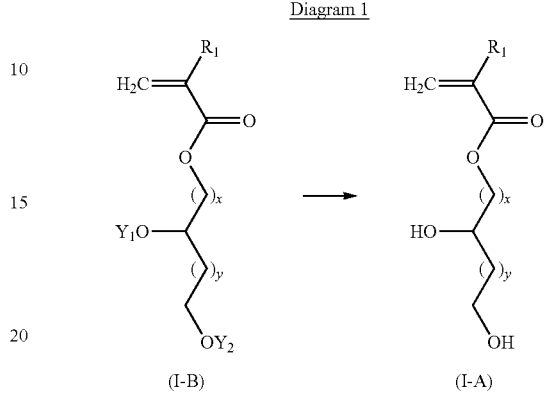

with R$_1$, Y$_1$, Y$_2$, x and y as defined in the general formula (I-B) described above.

The deprotection reaction of the diol functions of the monomer of general formula (I-B) is well known to a person skilled in the art. He knows how to adapt the deprotection reaction conditions as a function of the nature of the protective groups Y$_1$ and Y$_2$.

The monomer M1 of general formula (I-B) can be obtained by a reaction of a compound of general formula (I-c) with an alcohol compound of general formula (I-b) according to the reaction diagram 2 below:

Diagram 2

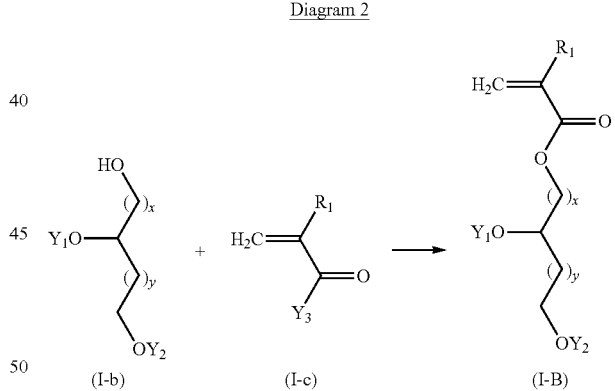

in which:
Y$_3$ is selected from the group formed by a halogen atom, preferably chlorine, —OH and O—C(O)—R'$_1$ with R'$_1$ selected from the group formed by —H, —CH$_3$ and —CH$_2$—CH$_3$, preferably —H and —CH$_3$;
R$_1$, Y$_1$, Y$_2$, x and y have the same meaning as that given in general formula (I-B).

These coupling reactions are well known to a person skilled in the art. The compound of general formula (I-c) is commercially available from the suppliers: Sigma-Aldrich® and Alfa Aesar®.

The alcohol compound of general formula (I-b) is obtained from the corresponding polyol of formula (I-a) by protection of the diol functions according to the following reaction diagram 3:

Diagram 3

(I-a) → protection → (I-b)

with x, y, $Y_1$ and $Y_2$ as defined in the general formula (I-B).

The protection reaction of the diol functions of the compound of general formula (I-a) is well known to a person skilled in the art. He knows how to adapt the protection reaction conditions as a function of the nature of the protective groups $Y_1$ and $Y_2$ used. The polyol of general formula (I-a) is commercially available from the suppliers: Sigma-Aldrich® and Alfa Aesar®.

Monomer M2

The second monomer of the statistical copolymer of the invention has the general formula (II):

(II)

in which:
  $R_2$ is selected from the group formed by —H, —$CH_3$ and —$CH_2$—$CH_3$, preferably —H and —$CH_3$;
  $R_3$ is selected from the group formed by a $C_6$-$C_{18}$ aryl group, a $C_6$-$C_{18}$ aryl substituted by an $R'_3$, —C(O)—O—$R'_3$; —O—$R'_3$, —S—$R'_3$ and —C(O)—N(H)—$R'_3$ group with $R'_3$ a $C_1$-$C_{30}$ alkyl group.

Preferably, $R'_3$ is a $C_1$-$C_{30}$ alkyl group of which the hydrocarbon-containing chain is linear. Preferably, $R_3$ is selected from the group formed by a $C_6$-$C_{18}$ aryl group, preferably a $C_6$ aryl, and —C(O)—O—$R'_3$ with $R'_3$ a $C_1$-$C_{30}$ alkyl group.

Among the monomers of formula (II), the monomers corresponding to formula (II-A) form part of those preferred:

(II-A)

in which:
  $R_2$ is selected from the group formed by —H, —$CH_3$ and —$CH_2$—$CH_3$, preferably —H and —$CH_3$;
  $R''_3$ is a $C_1$-$C_{14}$ alkyl group.

By "$C_1$-$C_{14}$ alkyl group", is meant a saturated, linear or branched hydrocarbon-containing chain comprising from 1 to 14 carbon atoms. Preferably, the hydrocarbon-containing chain is linear. Preferably, the hydrocarbon-containing chain comprises from 4 to 12 carbon atoms.

Among the monomers of formula (II), the monomers corresponding to formula (II-B) also form part of those preferred:

(II-B)

in which:
  $R_2$ is selected from the group formed by —H, —$CH_3$ and —$CH_2$—$CH_3$, preferably —H and —$CH_3$;
  $R'''_3$ is a $C_{15}$-$C_{30}$ alkyl group.

By "$C_{15}$-$C_{30}$ alkyl group", is meant a saturated, linear or branched hydrocarbon-containing chain comprising from 15 to 30 carbon atoms. Preferably, the hydrocarbon-containing chain is linear. Preferably, the hydrocarbon-containing chain comprises from 16 to 24 carbon atoms.

Obtaining the Monomer M2

The monomers of formula (II), (II-A) and, (II-B) are well known to a person skilled in the art. They are marketed by Sigma-Aldrich® and TCI®.

Preferred Polydiol Copolymers

In an embodiment, a preferred statistical copolymer results from the copolymerization of at least:
  a first monomer M1 of general formula (I) as described previously;
  a second monomer M2 of formula (II) as described previously, in which $R_2$ is —H and $R_3$ is a $C_6$-$C_{18}$ aryl group; preferably $R_3$ is phenyl.

In another embodiment, a preferred statistical copolymer results from the copolymerization of at least:
  a first monomer M1 of general formula (I) as described previously;
  a second monomer M2 of formula (II-A) as described previously; and
  a third monomer M2 of formula (II-B) as described previously.

According to this other embodiment, a preferred statistical copolymer results from the copolymerization of at least:
  a first monomer M1 of general formula (I) as described previously;
  a second monomer M2 of formula (II-A) in which $R_2$ is —$CH_3$ and $R''_3$ is a $C_4$-$C_{12}$ alkyl group, preferably a linear $C_4$-$C_{12}$ alkyl;
  a third monomer M2 of formula (II-B) in which $R_2$ is —$CH_3$ and $R'''_3$ is a $C_{16}$-$C_{24}$ alkyl group, preferably a linear $C_{16}$-$C_{24}$ alkyl.

According to this embodiment, a preferred statistical copolymer results from the copolymerization of at least:
  a first monomer M1 of general formula (I) as described previously;
  a second monomer M2 selected from the group formed by n-octyl methacrylate, n-decyl methacrylate and n-dodecyl methacrylate;
  a third monomer M2 selected from the group formed by palmityl methacrylate, stearyl methacrylate, arachidyl methacrylate and behenyl methacrylate.

Process for Obtaining the Polydiol Copolymers

A person skilled in the art is in a position to synthesize the polydiol statistical copolymers A1 by calling on his general knowledge. The copolymerization can be initiated by bulk polymerization or in solution in an organic solvent by compounds that generate free radicals. For example, the copolymers of the invention are obtained by the processes known as radical polymerization, in particular controlled radical copolymerization, such as the method called radical polymerization controlled by Reversible Addition-Fragmentation Chain Transfer (RAFT) and the method called radical copolymerization controlled by Atom Transfer Radical Polymerization (ARTP). Conventional radical polymerization and telomerization can also be used for the preparation of the copolymers of the invention (Moad, G.; Solomon, D. H., The Chemistry of Radical Polymerization. 2nd ed.; Elsevier Ltd: 2006; p 639; Matyaszewski, K.; Davis, T. P. Handbook of Radical Polymerization; Wiley-Interscience: Hoboken, 2002; p 936).

A process for the preparation of a statistical copolymer comprises at least one polymerization step (a) in which at least the following are brought into contact:

i) a first monomer M1 of general formula (I):

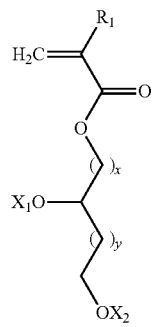

in which:

$R_1$ is selected from the group formed by —H, —CH$_3$, and —CH$_2$—CH$_3$;

x is an integer ranging from 2 to 18;

y is an integer equal to 0 or 1;

$X_1$ and $X_2$, identical or different, are selected from the group formed by hydrogen, tetrahydropyranyl, methyloxymethyl, ter-butyl, benzyl, trimethylsilyl and t-butyl dimethylsilyl;

or $X_1$ and $X_2$ form with the oxygen atoms a bridge of the following formula

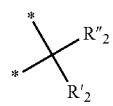

in which the stars (*) symbolize the bonds to the oxygen atoms;

$R'_2$ and $R''_2$, identical or different, are selected from the group formed by hydrogen and a $C_1$-$C_{11}$ alkyl, preferably methyl;

or $X_1$ and $X_2$ form with the oxygen atoms a boronic ester of the following formula

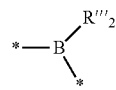

in which:

the stars (*) symbolize the bonds to the oxygen atoms;

$R'''_2$ is selected from the group formed by a $C_6$-$C_{18}$ aryl, a $C_7$-$C_{18}$ aralkyl and $C_2$-$C_{18}$ alkyl, preferably a $C_6$-$C_{18}$ aryl;

ii) at least one second monomer M2 of general formula (II):

in which:

$R_2$ is selected from the group formed by —H, —CH$_3$ and —CH$_2$—CH$_3$;

$R_3$ is selected from the group formed by a $C_6$-$C_{18}$ aryl, a $C_6$-$C_{18}$ aryl substituted by an $R'_3$, —C(O)—O—$R'_3$; —O—$R'_3$, —S—$R'_3$ and —C(O)—N(H)—$R'_3$ group with $R'_3$ a $C_1$-$C_{30}$ alkyl group;

iii) at least one source of free radicals.

In an embodiment, the process can comprise moreover iv) at least one chain-transfer agent. By "a source of free radicals" is meant a chemical compound making it possible to generate a chemical species having one or more electrons which are not paired in its outer shell. A person skilled in the art can use any source of free radicals known per se and suitable for the polymerization processes, in particular controlled radical polymerization. Among the sources of free radicals, the following are preferred, by way of illustration: benzoyl peroxide, tert-butyl peroxide, the diazo compounds such as azobisisobutyronitrile, the peroxygenated compounds such as persulphates or hydrogen peroxide, the redox systems such as the oxidation of Fe$^{2+}$, the persulphates/sodium-metabisulphite mixtures, or ascorbic acid/hydrogen peroxide mixtures or also the compounds which can be cleaved photochemically or by ionizing radiation, for example ultra-violet rays or by beta or gamma radiation.

By "chain-transfer agent", is meant a compound the goal of which is to ensure homogeneous growth of the macromolecular chains by transfer reactions which are reversible between species during growth, i.e. polymer chains terminated by a carbon-containing radical, and dormant species, i.e. polymer chains terminated by a transfer agent. This reversible transfer process makes it possible to control the molecular masses of copolymers thus prepared. Preferably in the process of the invention, the chain-transfer agent comprises a thiocarbonylthio group —S—C(=S)—. By way of illustration of a chain-transfer agent, the dithioesters, trithiocarbonates, xanthates and dithiocarbamates can be mentioned. A preferred transfer agent is cumyl dithiobenzoate or 2-cyano-2-propyl benzodithioate.

By "chain-transfer agent", is also meant a compound the goal of which is to limit the growth of the macromolecular chains during formation by the addition of monomer molecules and to initiate new chains, which makes it possible to limit the final molecular masses, or even to control them. Such a type of transfer agent is used in telomerization. A preferred transfer agent is cysteamine.

The process for the preparation of a polydiol statistical copolymer can comprise:
at least one step of polymerization (a) as defined above, in which the monomers M1 and M2 are selected with $X_1$ and $X_2$ different from hydrogen, and moreover
at least one step of deprotection (b) of the diol functions of the copolymer obtained at the end of step (a), so as to obtain a copolymer in which $X_1$ and $X_2$ are identical and are a hydrogen atom.

In an embodiment, the polymerization step (a) comprises the bringing into contact of at least one monomer M1 with at least two monomers M2 having different $R_3$ groups. In this embodiment, one of the monomers M2 has the general formula (II-A):

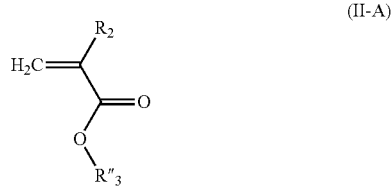

(II-A)

in which:
$R_2$ is selected from the group formed by —H, —$CH_3$ and —$CH_2$—$CH_3$;
$R''_3$ is a $C_1$-$C_{14}$ alkyl group;
and the other monomer M2 has the general formula (II-B):

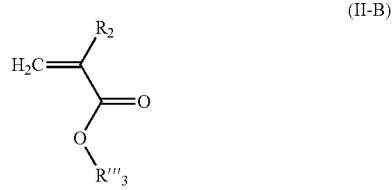

(II-B)

in which:
$R_2$ is selected from the group formed by —H, —$CH_3$ and —$CH_2$—$CH_3$;
$R'''_3$ is a $C_{15}$-$C_{30}$ alkyl group.

The preferences and definitions described for the general formulae (I), (I-A), (I-B), (II-A), (II-B) also apply to the processes described above.

Properties of the Polydiol Copolymers A1

Figure 2:
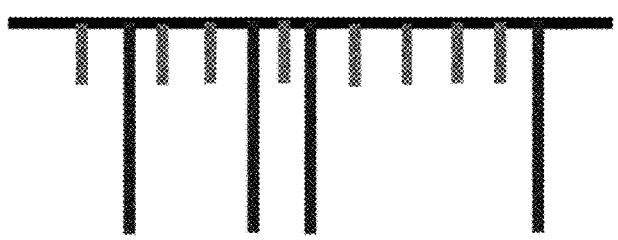
FIG. 2 shows diagrammatically a comb copolymer.

The polydiol statistical copolymers A1 are comb copolymers. By "comb copolymers", is meant a copolymer having a main chain (also called backbone) and side chains. The side chains are pendant on both sides of the main chain. The length of each side chain is less than the length of the main chain. FIG. 2 diagrammatically shows a comb polymer.

The copolymers A1 have a backbone of polymerizable functions, in particular a backbone of methacrylate functions, and a mixture of hydrocarbon-containing side chains substituted or not by diol functions. As the monomers of formula (I) and (II) have polymerizable functions of identical or substantially identical reactivity, a copolymer is obtained the monomers of which, having diol functions, are distributed statistically along the backbone of the copolymer with respect to the monomers the alkyl chains of which are non-substituted by diol functions.

The polydiol statistical copolymers A1 have the advantage of being sensitive to external stimuli, such as the temperature, pressure, shear rate; this sensitivity being demonstrated by a change in properties. In response to a stimulus, the spatial conformation of the copolymer chains is modified and the diol functions are rendered more accessible or less accessible to the association reactions capable of generating cross-linking, as well as to the exchange reactions. These association and exchange processes are reversible. The copolymer A1 is a thermosensitive copolymer, i.e. it is sensitive to changes in temperature.

Advantageously, the side chains of the polydiol statistical copolymer A1 have an average length ranging from 8 to 20 carbon atoms, preferably from 9 to 15 carbon atoms. By "average length of side chain" is meant the average length of the side chains of each monomer constituting the copolymer. A person skilled in the art knows how to obtain this average length by appropriately selecting the types and the ratio of monomers constituting the polydiol statistical copolymer. The choice of this average chain length makes it possible to obtain a polymer which is soluble in a hydrophobic medium, whatever the temperature at which the copolymer is dissolved. The copolymer A1 is therefore miscible in a hydrophobic medium. By "hydrophobic medium" is meant a medium which has no or very little affinity for water, i.e. it is not miscible in water or in an aqueous medium.

Advantageously, the polydiol statistical copolymer A1 has a molar percentage of monomer M1 of formula (I) in said copolymer ranging from 1 to 30%, preferably 5 to 25%, more preferably ranging from 9 to 21%. In a preferred embodiment, the polydiol statistical copolymer A1 has a molar percentage of monomer M1 of formula (I) in said copolymer ranging from 1 to 30%, preferably 5 to 25%, more preferably ranging from 9 to 21%, a molar percentage of monomer M2 of formula (II-A) ranging from 8 to 92% and a molar percentage of monomer M2 of formula (II-B) ranging from 0.1 to 62%. The molar percentage of monomers in the copolymer results directly from adjustment of the quantities of monomers utilized for the synthesis of the copolymer. In a preferred embodiment, the polydiol statistical copolymer A1 has a molar percentage of monomer M1 of formula (I) in said copolymer ranging from 1 to 30%, a molar percentage of monomer M2 of formula (II-A) ranging from 8 to 62% and a molar percentage of monomer M2 of formula (II-B) ranging from 8 to 91%. The molar percentage of monomers in the copolymer results directly from adjustment of the quantities of monomers utilized for the synthesis of the copolymer.

Advantageously, the polydiol statistical copolymer A1 has a number-average degree of polymerization ranging from 100 to 2000, preferably from 150 to 1000. The degree of polymerization is controlled in a known way by using a controlled radical polymerization technique, a telomerization technique, or by adjusting the source quantity of free radicals when the copolymers of the invention are prepared by conventional radical polymerization.

Advantageously, the polydiol statistical copolymer A1 has a polydispersity index (PDI) ranging from 1.05 to 3.75; preferably ranging from 1.10 to 3.45. The polydispersity index is obtained by steric exclusion chromatography measurement using a polystyrene calibration. Advantageously, the polydiol statistical copolymer A1 has a number-average molar mass ranging from 10,000 to 400,000 g/mol, preferably from 25,000 to 150,000 g/mol, the number-average molar mass being obtained by steric exclusion chromatography measurement using a polystyrene calibration. The method of steric exclusion chromatography measurement using a polystyrene calibration is described in the work (Fontanille, M.; Gnanou, Y., Chimie et physico-chimie des polymères. 2nd ed.; Dunod: 2010; p 546).

Compound A2 Diboronic Ester

In an embodiment of the composition of the invention, the compound A2 comprising two boronic ester functions has the general formula (III):

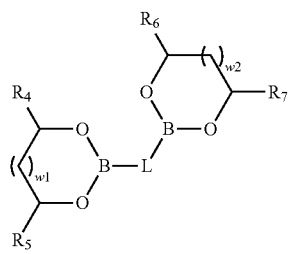

in which:
- $w_1$ and $w_2$, identical or different, are integers selected between 0 and 1,
- $R_4$, $R_5$, $R_6$ and $R_7$, identical or different, are selected from the group formed by hydrogen and a hydrocarbon-containing group having from 1 to 24 carbon atoms, preferably from 4 to 18 carbon atoms, preferably from 6 to 14 carbon atoms;
- L is a divalent bond group and selected from the group formed by a $C_6$-$C_{18}$ aryl, a $C_7$-$C_{24}$ aralkyl and a $C_2$-$C_{24}$ hydrocarbon-containing chain, preferably a $C_6$-$C_{18}$ aryl.

By "hydrocarbon-containing group having from 1 to 24 carbon atoms" is meant a linear or branched alkyl or alkenyl group, having from 1 to 24 carbon atoms. Preferably, the hydrocarbon-containing group comprises from 4 to 18 carbon atoms, preferably from 6 to 14 carbon atoms. Preferably, the hydrocarbon-containing group is a linear alkyl. By "$C_2$-$C_{24}$ hydrocarbon-containing chain" is meant a linear or branched alkyl or alkenyl group, comprising from 2 to 24 carbon atoms. Preferably, the hydrocarbon-containing chain is a linear alkyl group. Preferably the hydrocarbon-containing chain comprises from 6 to 16 carbon atoms.

In an embodiment of the invention, the compound A2 is a compound of general formula (III) above in which:
- $w_1$ and $w_2$, identical or different, are integers selected between 0 and 1;
- $R_4$ and $R_6$ are identical and are hydrogen atoms;
- $R_5$ and $R_7$ are identical and are a hydrocarbon-containing group, preferably a linear alkyl, having from 1 to 24 carbon atoms, preferably from 4 to 18 carbon atoms, preferably from 6 to 16 carbon atoms;
- L is a divalent bond group and is a $C_6$-$C_{18}$ aryl, preferably phenyl.

The boronic diester compound A2 of formula (III) as described above is obtained by a condensation reaction between a boronic acid of general formula (III-a) and diol functions of the compounds of general formula (III-b) and (III-c) according to the reaction diagram 4 below:

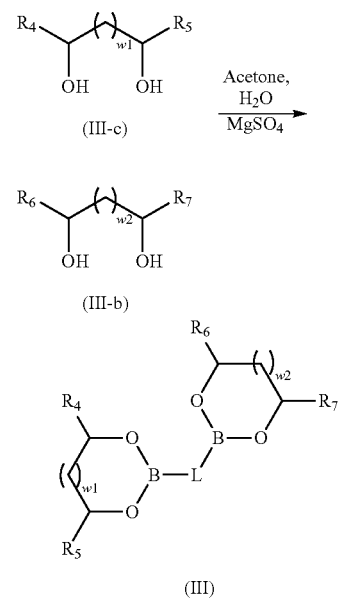

with $w_1$, $w_2$, L, $R_4$, $R_5$, $R_6$ and $R_7$, as defined above.

Indeed, by condensation of the boronic acid functions of the compound (III-a) with diol functions of the compounds of formula (III-b) and of formula (III-c), compounds having two boronic ester functions are obtained (compound of formula (III)). This step is carried out according to means well known to a person skilled in the art. Within the context of the present invention, the compound of general formula (III-a) is dissolved, in the presence of water, in a polar solvent such as acetone. The presence of water allows the chemical equilibria between the molecules of boronic acid of formula (III-a) and the boroxine molecules obtained from the boronic acids of formula (III-a) to be shifted. Indeed, it is well known that the boronic acids can spontaneously form boroxine molecules at ambient temperature. Now, the presence of boroxine molecules is undesirable within the context of the present invention.

The condensation reaction is carried out in the presence of a dehydration agent such as magnesium sulphate. This agent makes it possible to trap the water molecules initially introduced as well as those that are released by the condensation between the compound of formula (III-a) and the compound of formula (III-b) and between the compound of formula (III-a) and the compound of formula (III-c). In an embodiment, the compound (III-b) and the compound (III-c) are identical. A person skilled in the art knows how to adapt the quantities of reagents of formula (III-b) and/or (III-c) and of formula (III-a) in order to obtain the product of formula (III).

Compound A2 Boronic Ester Copolymer

In another embodiment of the composition of the invention, the compound A2 comprising at least two boronic ester functions is a boronic ester statistical copolymer resulting from the copolymerization of at least one monomer M3 of formula (IV) as described below with at least one monomer M4 of formula (V) as described below.

Monomer M3 of Formula (IV)

The monomer M3 of the boronic ester statistical copolymer compound A2 has the general formula (IV) in which:

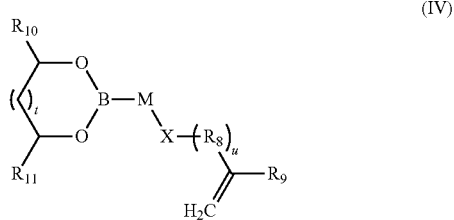

(IV)

in which:
t is an integer equal to 0 or 1;
u is an integer equal to 0 or 1;
M and $R_8$ are divalent bond groups, identical or different, and are selected from the group formed by a $C_6$-$C_{18}$ aryl, a $C_7$-$C_{24}$ aralkyl and $C_2$-$C_{24}$ alkyl, preferably a $C_6$-$C_{18}$ aryl,
X is a function selected from the group formed by —O—C(O)—, —C(O)—O—, —C(O)—N(H)—, —N(H)—C(O)—, —S—, —N(H)—, —N(R'$_4$)— and —O— with R'$_4$ a hydrocarbon-containing chain comprising from 1 to 15 carbon atoms;
$R_9$ is selected from the group formed by —H, —CH$_3$ and —CH$_2$—CH$_3$; preferably —H and —CH$_3$;
$R_{10}$ and $R_{11}$, identical or different, are selected from the group formed by hydrogen and a hydrocarbon-containing chain having from 1 to 24 carbon atoms, preferably between 4 and 18 carbon atoms, preferably between 6 and 12 carbon atoms;

By "$C_2$-$C_{24}$ alkyl" is meant a saturated, linear or branched hydrocarbon-containing chain comprising from 2 to 24 carbon atoms. Preferably, the hydrocarbon-containing chain is linear. Preferably the hydrocarbon-containing chain comprises from 6 to 16 carbon atoms. By "hydrocarbon-containing chain comprising from 1 to 15 carbon atoms" is meant a linear or branched alkyl or alkenyl group, comprising from 1 to 15 carbon atoms. Preferably, the hydrocarbon-containing chain is a linear alkyl group. Preferably, it comprises from 1 to 8 carbon atoms. By "hydrocarbon-containing chain comprising from 1 to 24 carbon atoms" is meant a linear or branched alkyl or alkenyl group, comprising from 1 to 24 carbon atoms. Preferably, the hydrocarbon-containing chain is a linear alkyl group. Preferably, it comprises from 4 to 18 carbon atoms, preferably between 6 and 12 carbon atoms.

In an embodiment of the invention, the monomer M3 has the general formula (IV) in which:
t is an integer equal to 0 or 1;
u is an integer equal to 0 or 1;
M and $R_8$ are divalent bond groups and are different, M is a $C_6$-$C_{18}$ aryl, preferably phenyl, $R_8$ is a $C_7$-$C_{24}$ aralkyl, preferably benzyl;
X is a function selected from the group formed by —O—C(O)—, —C(O)—O—, —C(O)—N(H)— and —O—, preferably —C(O)—O— or —O—C(O)—;
$R_9$ is selected from the group formed by —H, —CH$_3$, preferably —H;
$R_{10}$ and $R_{11}$ are different, one of the $R_{10}$ or $R_{11}$ groups is H and the other $R_{10}$ or $R_{11}$ group is a hydrocarbon-containing chain, preferably a linear alkyl group, having from 1 to 24 carbon atoms, preferably between 4 and 18 carbon atoms, preferably between 6 and 12 carbon atoms.

Synthesis of the Monomer M3 of Formula (IV)

In all the diagrams shown below, unless stated otherwise, the variables $R_{10}$, $R_{11}$, M, u, t, X, $R_8$, R'$_4$ and $R_9$ have the same definition as in formula (IV) above. The monomers M3 of formula (IV) are in particular obtained from a preparation process comprising at least one step of condensation of a boronic acid of general formula (IV-f) with a diol compound of general formula (IV-g) according to the reaction diagram 5 below:

Diagram 5

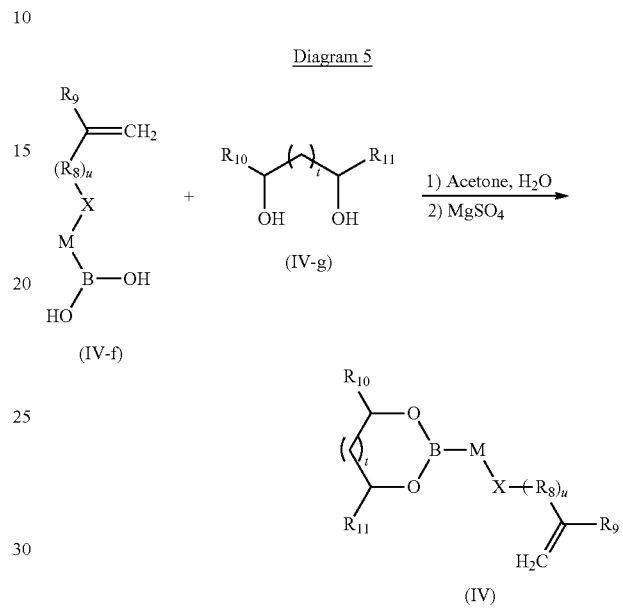

In fact, by condensation of the boronic acid functions of the compound of formula (IV-f) with diol functions of the compounds of formula (IV-g), a boronic ester compound of formula (IV) is obtained. This step is carried out according to methods well known to a person skilled in the art. Within the context of the present invention, the compound of general formula (IV-f) is dissolved, in the presence of water, in a polar solvent such as acetone. The condensation reaction is carried out in the presence of a dehydration agent, such as magnesium sulphate. The compounds of formula (IV-g) are commercially available from the following suppliers: Sigma-Aldrich®, Alfa Aesar® and TCI®.

The compound of formula (IV-f) is obtained directly from the compound of formula (IV-e) by hydrolysis according to the following reaction diagram 6:

Diagram 6

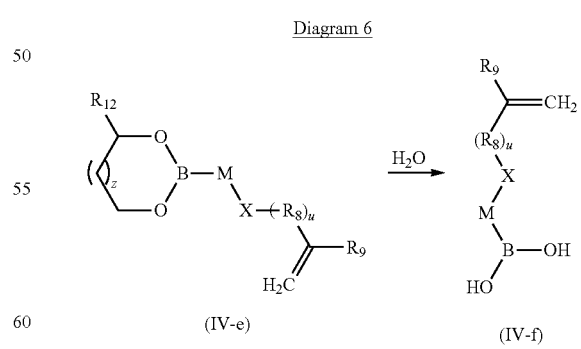

with
z an integer equal to 0 or 1;
$R_{12}$ is selected from the group formed by —H, —CH$_3$ and —CH$_2$—CH$_3$;
u, X, M, $R_8$ and $R_9$ as defined above.

The compound of formula (IV-e) is obtained by reaction of a compound of formula (IV-c) with a compound of formula (IV-d) according to the following reaction diagram 7:

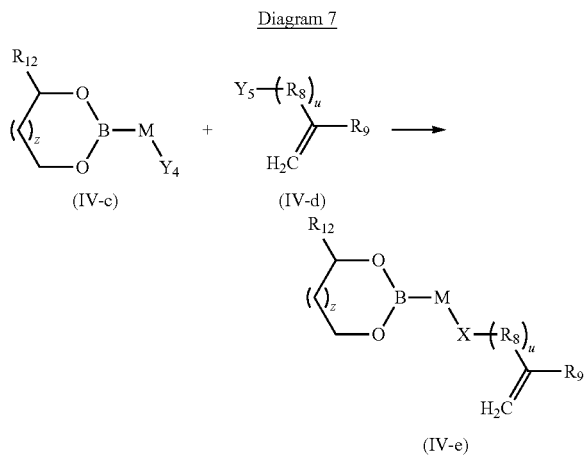

(IV-e)

with
z, u, $R_{12}$, M, $R'_4$, $R_9$ and $R_8$ as defined above;
and in this diagram when:

- X represents —O—C(O)—, then $Y_4$ represents an alcohol function —OH or a halogen atom, preferably chlorine or bromine and $Y_5$ is a carboxylic acid function —C(O)—OH;
- X represents —C(O)—O—, then $Y_4$ represents a carboxylic acid function —C(O)—OH and $Y_5$ is an alcohol function —OH or a halogen atom, and preferably chlorine or bromine;
- X represents —C(O)—N(H)—, then $Y_4$ represents a carboxylic acid function —C(O)—OH or a —C(O)—Hal function, and $Y_5$ is an amine function $NH_2$;
- X represents —N(H)—C(O)—, then $Y_4$ represents an amine function $NH_2$ and $Y_5$ is a carboxylic acid function —C(O)—OH or a —C(O)—Hal function;
- X represents —S—, then $Y_4$ is a halogen atom and $Y_5$ is a thiol function —SH or $Y_4$ is a thiol function —SH and $Y_5$ is a halogen atom;
- X represents —N(H)—, then $Y_4$ is a halogen atom and $Y_5$ is an amine function —$NH_2$ or $Y_4$ is an amine function —$NH_2$ and $Y_5$ is a halogen atom;
- X represents —N($R'_4$)—, then $Y_4$ is a halogen atom and $Y_5$ is an amine function —N(H)($R'_4$) or $Y_4$ is an amine function —N(H)($R'_4$) and $Y_5$ is a halogen atom;
- X represents —O—, then $Y_4$ is a halogen atom and $Y_5$ is an alcohol function OH or $Y_4$ is an alcohol function —OH and $Y_5$ is a halogen atom.

These esterification, etherification, thioetherification, alkylation or condensation reactions between an amine function and a carboxylic acid function are well known to a person skilled in the art. A person skilled in the art therefore knows how to select the reaction conditions depending on the chemical nature of the $Y_1$ and $Y_2$ groups in order to obtain the compound of formula (IV-e). The compounds of formula (IV-d) are commercially available from the suppliers: Sigma-Aldrich®, TCI® and Acros Organics®.

The compound of formula (IV-c) is obtained by a condensation reaction between a boronic acid of formula (IV-a) with at least one diol compound of formula (IV-b) according to the following reaction diagram 8:

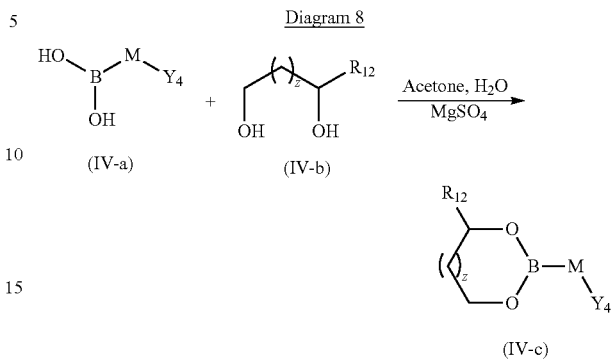

with M, $Y_4$, z and $R_{12}$ as defined above,

Among the compounds of formula (IV-b), the one in which $R_{12}$ is methyl and z=0 is preferred. The compounds of formula (IV-a) and (IV-b) are commercially available from the following suppliers Sigma-Aldrich®, Alfa Aesar® and TCI®.

Monomer M4 of General Formula (V):

The monomer M4 of the boronic ester statistical copolymer compound A2 has the general formula (V)

in which:
$R_{12}$ is selected from the group formed by —H, —$CH_3$ and —$CH_2$—$CH_3$, preferably —H and —$CH_3$;
$R_{13}$ is selected from the group formed by a $C_6$-$C_{18}$ aryl, a $C_6$-$C_{18}$ aryl substituted by an $R'_{13}$ group, —C(O)—O—$R'_{13}$, —O—$R'_{13}$, —S—$R'_{13}$ and —C(O)—N(H)—$R'_{13}$ with $R'_{13}$ a $C_1$-$C_{25}$ alkyl group.

By "$C_1$-$C_{25}$ alkyl group", is meant a saturated, linear or branched hydrocarbon-containing chain comprising from 1 to 25 carbon atoms. Preferably, the hydrocarbon-containing chain is linear. By "$C_6$-$C_{18}$ aryl substituted by an $R_{13}$ group" group, is meant an aromatic hydrocarbon-containing compound comprising from 6 to 18 carbon atoms of which at least one carbon atom of the aromatic ring is substituted by a $C_1$-$C_{25}$ alkyl group as defined above. Preferably, $R_{13}$ is selected from the group formed by a $C_6$-$C_{18}$ aryl, preferably a $C_6$ aryl, and —C(O)—O—$R'_{13}$ with $R'_{13}$ a $C_1$-$C_{25}$ alkyl group.

Among the monomers of formula (V), the monomers corresponding to formula (V-A) form part of those preferred:

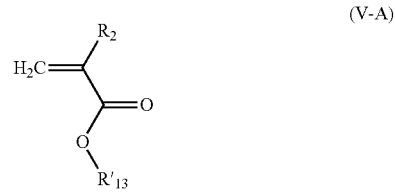

in which:
R$_2$ is selected from the group formed by —H, —CH$_3$ and —CH$_2$—CH$_3$, preferably —H and —CH$_3$;
R'$_{13}$ a C$_1$-C$_{25}$ alkyl group, preferably a linear C$_1$-C$_{25}$ alkyl, yet more preferably a linear C$_5$-C$_{15}$ alkyl.

Obtaining the Monomer M4:

The monomers of formulae (V) and (V-A) are well known to a person skilled in the art. They are marketed by Sigma-Aldrich® and TCI®.

Synthesis of the Boronic Ester Statistical Copolymer Compound A2

A person skilled in the art is in a position to synthesize the boronic ester statistical copolymers by calling on his general knowledge. The copolymerization can be initiated by bulk polymerization or in solution in an organic solvent by compounds generating free radicals. For example, the boronic ester statistical copolymers are obtained by the processes known as radical copolymerization, in particular controlled radical polymerization, such as the method called controlled radical copolymerization by Reversible Addition-Fragmentation Chain Transfer (RAFT) and the method called controlled radical polymerization by Atom Transfer Radical Polymerization (ARTP). Conventional radical polymerization and telomerization can also be used for the preparation of the copolymers of the invention (Moad, G.; Solomon, D. H., The Chemistry of Radical Polymerization. 2nd ed.; Elsevier Ltd: 2006; p 639; Matyaszewski, K.; Davis, T. P. Handbook of Radical Polymerization; Wiley-Interscience: Hoboken, 2002; p 936).

A process for the preparation of a boronic ester statistical copolymer comprises at least one polymerization step (a) in which at least the following are brought into contact:
i) a first monomer M3 of general formula (IV):

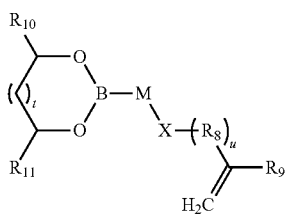

(IV)

in which:
t is an integer equal to 0 or 1;
u is an integer equal to 0 or 1;
M and R$_8$ are divalent bond groups, identical or different, and are selected from the group formed by a C$_6$-C$_{18}$ aryl, a C$_7$-C$_{24}$ aralkyl and a C$_2$-C$_{24}$ alkyl, preferably a C$_6$-C$_{18}$ aryl;
X is a function selected from the group formed by —O—C(O)—, —C(O)—O—, —C(O)—N(H)—, —N(H)—C(O)—, —S—, —N(H)—, —N(R'$_4$)— and —O— with R'$_4$ a hydrocarbon-containing chain comprising from 1 to 15 carbon atoms;
R$_9$ is selected from the group formed by —H, —CH$_3$ and —CH$_2$—CH$_3$; preferably —H;
R$_{10}$ and R$_{11}$, identical or different, are selected from the group formed by hydrogen and a hydrocarbon-containing chain having from 1 to 24 carbon atoms, preferably between 4 and 18 carbon atoms, preferably between 6 and 12 carbon atoms;

ii) at least one second monomer M4 of general formula (V):

(V)

in which:
R$_{12}$ is selected from the group formed by —H, —CH$_3$ and —CH$_2$—CH$_3$, preferably —H or —CH$_3$;
R$_{13}$ is selected from the group formed by a C$_6$-C$_{18}$ aryl, a C$_6$-C$_{18}$ aryl substituted by an R'$_{13}$, —C(O)—O—R'$_{13}$; —O—R'$_{13}$, —S—R'$_{13}$ and C(O)—N(H)—R'$_{13}$ group with R'$_{13}$ a C$_1$-C$_{25}$ alkyl group.
iii) at least one source of free radicals.

The process can comprise moreover iv) at least one chain-transfer agent. The preferences and definitions described for the general formulae (IV) and (V) also apply to the process. The sources of radicals and the transfer agents are those that have been described for the synthesis of polydiol statistical copolymers. The preferences described for the sources of radicals and of the transfer agents also apply to this process.

Properties of the Boronic Ester Statistical Copolymer Compounds A2

Advantageously, the chain formed by the sequence of the R$_{10}$, M, (R$_8$)$_u$ groups with u, an integer equal to 0 or 1, and X of the monomer M3 of general formula (IV) has a total number of carbon atoms ranging from 8 to 38, preferably ranging from 10 to 26. Advantageously, the side chains of the boronic ester statistical copolymer have an average length greater than 8 carbon atoms, preferably ranging from 11 to 16. This chain length makes it possible to solubilize the boronic ester statistical copolymer in a hydrophobic medium. By "average length of side chain" is meant the average length of the side chains of each monomer constituting the copolymer. A person skilled in the art knows how to obtain this average length by appropriately selecting the types and the ratio of monomers constituting the boronic ester statistical copolymer.

Advantageously, the boronic ester statistical copolymer has a molar percentage of monomer of formula (IV) in said copolymer ranging from 0.25 to 20%, preferably from 1 to 10%. Advantageously, the boronic ester statistical copolymer has a molar percentage of monomer of formula (IV) in said copolymer ranging from 0.25 to 20%, preferably from 1 to 10% and a molar percentage of monomer of formula (V) in said copolymer ranging from 80 to 99.75%, preferably from 90 to 99%. Advantageously, the boronic ester statistical copolymer has a number-average degree of polymerization ranging from 50 to 1500, preferably from 80 to 800.

Advantageously, the boronic ester statistical copolymer has a polydispersity index (PDI) ranging from 1.04 to 3.54; preferably ranging from 1.10 to 3.10. These values are obtained by steric exclusion chromatography using tetrahydrofuran as eluent and a polystyrene calibration. Advantageously, the boronic ester statistical copolymer has a number-average molar mass ranging from 10,000 to 200,000 g/mol preferably from 25,000 to 100,000 g/mol. These values are obtained by steric exclusion chromatography using tetrahydrofuran as eluent and a polystyrene calibration.

Characteristics of the Novel Compositions of the Invention

The compositions of the invention resulting from the mixture of at least one polydiol statistical copolymer A1 as defined above and of at least one compound A2 as defined previously have very varied rheological properties depending on the proportion of the compounds A1 and A2 used. The polydiol statistical copolymers A1 and the compounds A2 as defined above have the advantage of being associative and of exchanging chemical bonds in a thermoreversible manner, in particular in a hydrophobic medium, in particular an apolar hydrophobic medium. Under certain conditions, the polydiol statistical copolymers A1 and the compounds A2 as defined above can be cross-linked. The polydiol statistical copolymers A1 and the compounds A2 also have the advantage of being exchangeable.

Figure 4:
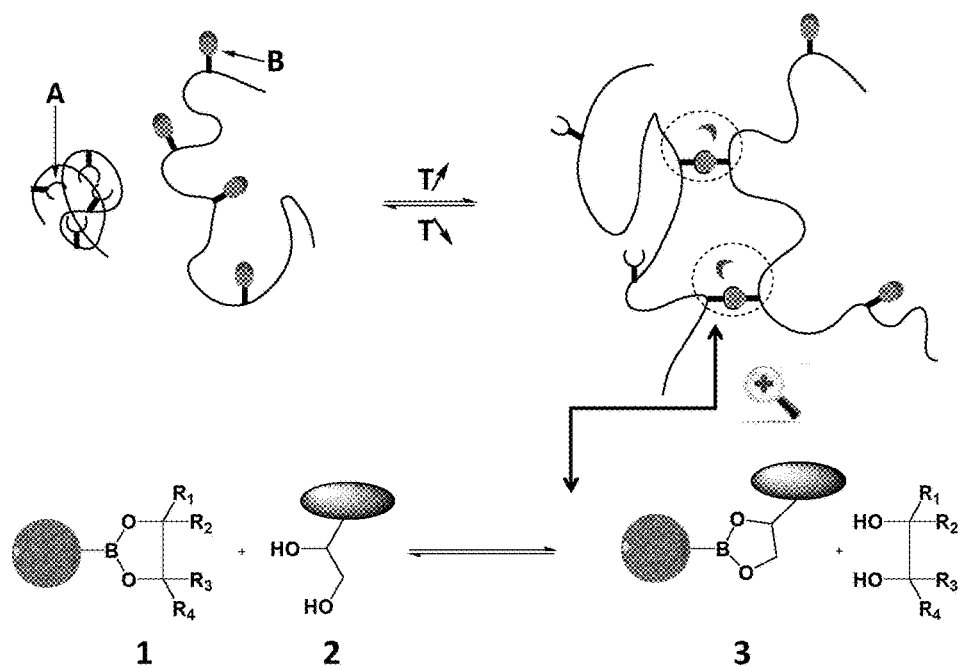
FIG. 4 shows diagrammatically the behaviour of the composition of the invention as a function of temperature. A statistical copolymer (2) having diol functions (function A) can associate in a thermoreversible manner with a statistical copolymer (1) having boronic ester functions (function B) via a transesterification reaction. The organic group of the boronic ester functions (function B) which is exchanged during the transesterification reaction is a diol symbolized by a black crescent. A chemical bond (3) of boronic ester type forms with release of a diol compound.

By "associative", is meant that covalent chemical bonds of boronic ester type are established between the polydiol statistical copolymers A1 and the compounds A2 comprising at least two boronic ester functions. FIG. 4 shows associative polymers. Depending on the functionality of the polydiols A1 and of the compounds A2 and depending on the composition of the mixtures, the formation of the covalent bonds between the polydiols A1 and the compounds A2 may or may not lead to the formation of a three-dimensional polymeric network. By "chemical bond", is meant a covalent chemical bond of boronic ester type.

Figure 9:
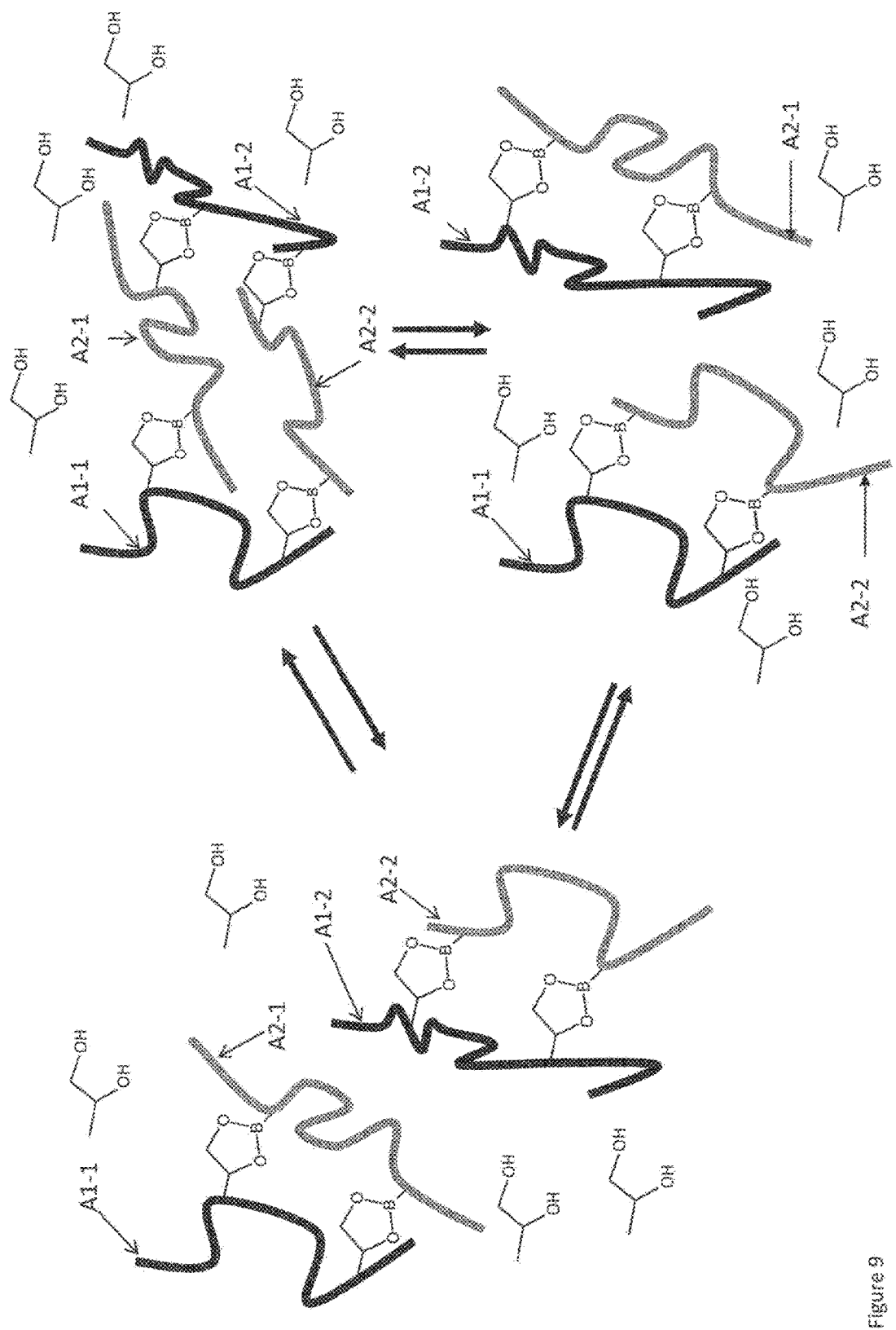
FIG. 9 shows diagrammatically the exchange reactions of boronic ester bonds between two polydiol statistical polymers (A1-1 and A1-2) and two boronic ester statistical polymers (A2-1 and A2-2) in the presence of diols.

By "exchangeable", is meant that the compounds are capable of exchanging chemical bonds between each other without the total number of chemical functions being modified. The boronic ester bonds of the compounds A2 as well as the boronic ester bonds formed by association of the polydiol statistical copolymers A1 and the compounds A2 can be exchanged with diol functions present in the composition in order to form new boronic esters and new diol functions without the total number of boronic ester functions and diol functions being affected. The chemical exchange reaction (transesterification) is shown in the following reaction diagram 9:

diols; this process is shown in FIG. 9. The polydiol statistical copolymer A1-1, which was associated with the polymer A2-1, has exchanged a boronic ester bond with the boronic ester statistical copolymer A2-2. The polydiol statistical copolymer A1-2, which was associated with the polymer A2-2, has exchanged a boronic ester bond with the boronic ester statistical copolymer A2-1; the total number of boronic ester bonds in the composition being unchanged and equal to 4. The copolymer A1-1 is then associated both with the polymer A2-1 and with the copolymer A2-2. The copolymer A1-2 is then associated both with the copolymer A2-1 and with the copolymer A2-2.

Another process of exchange of chemical bonds is shown in FIG. 9, in which it can be observed that the polydiol statistical copolymer A1-1, which was associated with the polymer A2-1, has exchanged two boronic ester bonds with the boronic ester statistical copolymer A2-2. The polydiol statistical copolymer A1-2, which was in association with the polymer A2-2, has exchanged two boronic ester bonds with the boronic ester statistical copolymer A2-1; the total number of boronic ester bonds in the composition being unchanged and equal to 4. The copolymer A1-1 is then associated with the polymer A2-2. The copolymer A1-2 is then associated with the polymer A2-1. The copolymer A2-1 has been exchanged with the polymer A2-2.

By "cross-linked", is meant a copolymer in the form of a network obtained by the establishment of bridges between the macromolecular chains of the copolymer. These chains, linked together, are mainly distributed in the three spatial dimensions. A cross-linked copolymer forms a three-dimensional network. In practice, the formation of a copolymer network is ensured by a solubility test. It is possible to verify that a network of copolymers has been formed by placing the copolymer network in a known solvent in order to dissolve Diagram 9

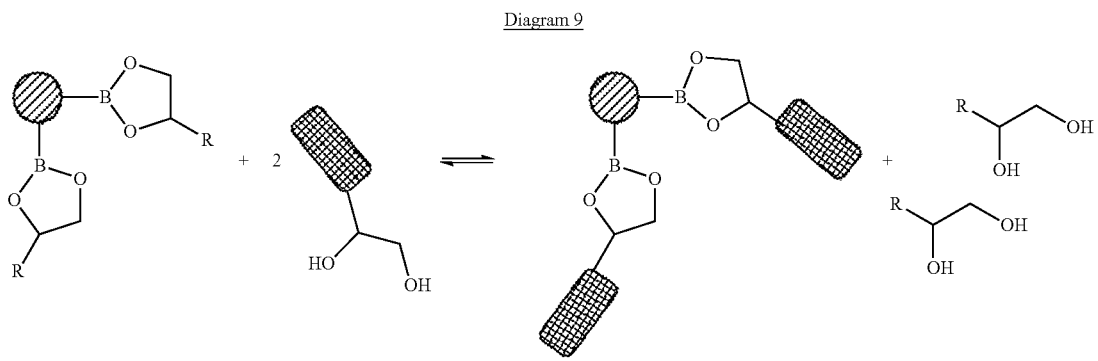

with:
R a chemical group of the compound A2,
the hatched circle symbolizes the remainder of the chemical structure of the compound A2,
the cross-hatched rectangle symbolizes the remainder of the chemical structure of the polydiol statistical copolymer A1.

Figure 3:
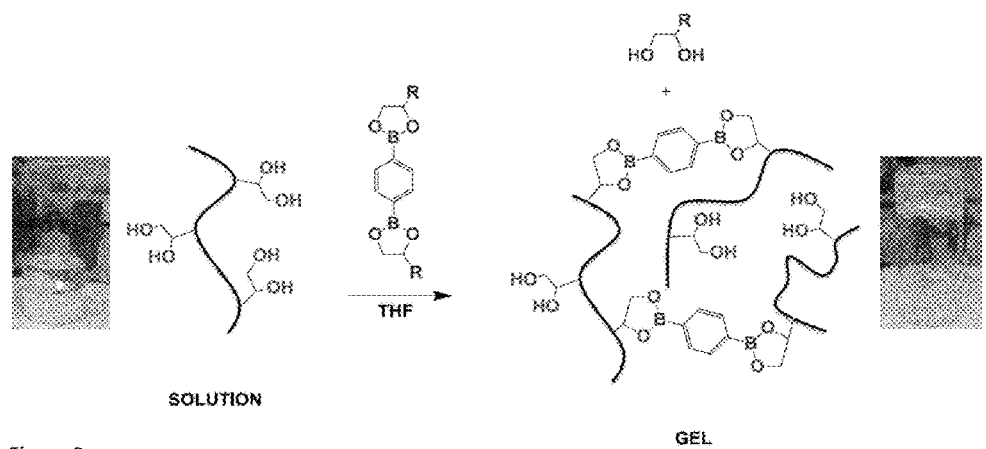
FIG. 3 illustrates and shows diagrammatically the cross-linking of the composition according to the invention in tetrahydrofuran (THF).

The boronic ester bonds of the compounds A2 as well as the boronic ester bonds formed by association of the polydiol statistical copolymers A1 and the compounds A2 can also be exchanged in order to form new boronic esters without the total number of boronic ester functions being affected. This other process of exchange of chemical bonds is carried out by metathesis reaction, via successive exchanges of boronic ester functions in the presence of the non-crosslinked copolymers of the same chemical composition. If the copolymer swells instead of dissolving, a person skilled in the art knows that a network has been formed. FIG. 3 illustrates this solubility test.

By "cross-linkable" is meant a copolymer capable of being cross-linked.

By "cross-linked in a reversible manner" is meant a cross-linked copolymer the bridges of which are formed by a reversible chemical reaction. The reversible chemical reaction can be shifted in one direction or another, leading to a change in structure of the polymer network. The copolymer can pass from an initial non cross-linked state to a cross-linked state (three-dimensional network of copolymers) and from a cross-linked state to an initial non cross-linked state. Within the context of the present invention, the bridges which form between the copolymer chains are labile. These bridges can form or be exchanged thanks to a chemical reaction which is reversible. Within the context of the present invention, the reversible chemical reaction is a transesterification reaction between diol functions of a statistical copolymer (copolymer A1) and the boronic ester functions of a cross-linking agent (compound A2). The bridges formed are bonds of the boronic ester type. These boronic ester bonds are covalent and labile due to the reversibility of the transesterification reaction.

By "cross-linked in a thermoreversible manner", is meant a copolymer which is cross-linked due to a reversible reaction the shift of which in one direction or in the other direction is controlled by the temperature. The thermoreversible cross-linking mechanism of the composition of the invention is shown diagrammatically in FIG. 4. Unexpectedly, the Applicant observed that at low temperature, the polydiol copolymer A1 (symbolized by the copolymer bearing the functions A in FIG. 4) is not, or only slightly, cross-linked by the boronic ester compounds A2 (symbolized by the compound bearing the functions B in FIG. 4). When the temperature increases, the diol functions of the copolymer A1 react with the boronic ester functions of the compound A2 by a transesterification reaction. The polydiol statistical copolymers A1 and the compounds A2 comprising at least two boronic ester functions then link together and can exchange. Depending on the functionality of the polydiols A1 and of the compounds A2 and depending on the composition of the mixtures, a gel may form in the medium, in particular when the medium is apolar. When the temperature reduces again, the boronic ester bonds between the polydiol statistical copolymers A1 and the compounds A2 break, and if applicable, the composition loses its gel character.

The quantity of boronic ester bonds (or boronic ester links) that can be established between the polydiol statistical copolymers A1 and the compounds A2 is adjusted by a person skilled in the art by means of an appropriate selection of the polydiol statistical copolymer A1, the compound A2 and the composition of the mixture. Moreover, a person skilled in the art knows how to select the structure of the compound A2 as a function of the structure of the statistical copolymer A1. Preferably, when the statistical copolymer A1 comprises at least one monomer M1 in which y=1, then the compound A2 of general formula (III) or the copolymer A2 comprising at least one monomer M3 of formula (IV) is preferably selected with $w_1=1$, $w_2=1$ and t=1, respectively.

Advantageously, the content of statistical copolymer A1 in the composition ranges from 0.1% to 99.5% by weight with respect to the total weight of the composition, preferably ranges from 0.25% to 80% by weight with respect to the total weight of the final composition, more preferably from 1% to 50% by weight with respect to the total weight of the final composition. Advantageously, the content of compound A2 in the composition ranges from 0.1% to 99.5% by weight with respect to the total weight of the composition, preferably ranges from 0.25% to 80% by weight with respect to the total weight of the final composition, more preferably from 0.5% to 50% by weight with respect to the total weight of the final composition. In an embodiment, the content of statistical copolymer A1 in the composition ranges from 0.5 to 99.5% by weight with respect to the total weight of the composition and the content of compound A2, in particular of the boronic ester statistical copolymer in the composition ranges from 0.5% to 99.5% by weight with respect to the total weight of the composition. Preferentially, the ratio by weight between the polydiol statistical compound A1 and compound A2 (ratio A1/A2) in the composition ranges from 0.005 to 200, preferably from 0.05 to 20, yet more preferably from 0.1 to 10.

In an embodiment, the composition of the invention comprises:
  0.5% to 40% by weight, with respect to the total weight of the composition, of a mixture of at least one polydiol statistical copolymer A1 as defined previously and at least one compound A2 as defined previously, preferably the mixture comprising from 0.5% to 99.5% by weight of the statistical copolymer A1 with respect to the total weight of the mixture and from 0.5% to 99.5% by weight of the compound A2, in particular of the boronic ester statistical copolymer, with respect to the total weight of the mixture;
  60% to 99.5% by weight, with respect to the total weight of the composition, of a hydrophobic medium.

In an embodiment, the composition of the invention essentially consists of:
  0.5% to 40% by weight, with respect to the total weight of the composition, of a mixture of at least one polydiol statistical copolymer A1 as defined previously and at least one compound A2 as defined previously, preferably the mixture comprising from 0.5% to 99.5% by weight of the statistical copolymer A1 with respect to the total weight of the mixture and from 0.5% to 99.5% by weight of the compound A2, in particular of the boronic ester statistical copolymer, with respect to the total weight of the mixture;
  60% to 99.5% by weight, with respect to the total weight of the composition, of a hydrophobic medium.

In an embodiment, the composition of the invention is presented in the form of a stock composition. By "stock composition" is meant, a composition from which a person skilled in the art can make working solutions by sampling a certain quantity of stock solution completed by making up with a necessary quantity of diluent (solvent or other) in order to obtain a desired concentration. A working composition is therefore obtained by dilution of a stock composition.

A hydrophobic medium can be a solvent, a mineral oil, a natural oil, a synthetic oil. In an embodiment, the composition of the invention can comprise moreover at least one additive selected from the group formed by the thermoplastics, elastomers, thermoplastic elastomers, thermosetting polymers, pigments, dyes, fillers, plasticizers, fibres, antioxidants, additives for lubricants, compatibilizing agents, anti-foaming agents, dispersant additives, adhesion promoters and stabilizing agents.

Process for the Preparation of the Novel Compositions of the Invention

The novel compositions of the invention are prepared by means well known to a person skilled in the art. For example, it is sufficient for a person skilled in the art in particular to:
  sample a desired quantity of a solution comprising the polydiol statistical copolymer A1 as defined above;
  sample a desired quantity of a solution comprising the compound A2 as defined above;
  mix the two solutions sampled in order to obtain the composition of the invention.

A person skilled in the art also knows how to adjust the different parameters of the composition of the invention in order to obtain either a composition in which the polydiol statistical copolymer A1 and the compound A2, in particular the boronic ester statistical copolymer, are associated or a composition in which the polydiol statistical copolymer A1 and the compound A2, in particular the boronic ester statistical copolymer, are cross-linked. For example, a person skilled in the art knows how to adjust in particular:

the molar percentage of monomer M1 bearing diol functions in the polydiol statistical copolymer A1;

the molar percentage of monomer M3 bearing the boronic ester functions in the boronic ester statistical copolymer A2;

the average length of the side chains of the polydiol statistical copolymer A1;

the average length of the side chains of the boronic ester statistical copolymer A2;

the length of the monomer M3 of the boronic ester statistical copolymer A2;

the length of the boronic diester compound A2;

the number-average degree of polymerization of the polydiol statistical copolymers A1 and of the boronic ester statistical copolymers A2;

the percentage by weight of the polydiol statistical copolymer A1;

the percentage by weight of the diboronic ester compound A2;

the percentage by weight of the boronic ester statistical copolymer A2;

etc.

Use of the Novel Compositions of the Invention

The compositions of the invention can be used in all the solutions the viscosity of which varies as a function of temperature. The compositions of the invention make it possible to thicken a fluid and to control its viscosity. The polydiol statistical copolymers A1, the compounds A2 and the compositions can be used in fields as varied as improved oil recovery, the paper industry, paints, food additives, cosmetic or pharmaceutical formulation.

For example, the compositions of the invention can be added to compositions for lubricating mechanical parts. Indeed, the behaviour of the novel compositions of the invention when they are introduced into a base oil, is inverse vis-à-vis temperature change compared with the behaviour of the base oil and the polymer-type rheological additives of the prior art. Unlike the base oil, which liquefies when the temperature increases, the compositions of the present invention have the advantage of thickening when the temperature increases. The formation of reversible covalent bonds makes it possible to increase (reversibly) the molar mass of the polymers and therefore limits the drop in viscosity of the base oil at high temperatures. Advantageously, the viscosity of the lubricating composition is therefore controlled and is less dependent on temperature fluctuations.

EXAMPLES

The following examples illustrate the invention without limiting it.

1 Synthesis of Polymethacrylate Statistical Copolymers A1 Bearing a Diol Function 1.1: Starting from a Monomer Bearing a Diol Function Protected in Ketal Form In an embodiment, the statistical copolymer A1 of the invention is obtained according to the following reaction diagram 10:

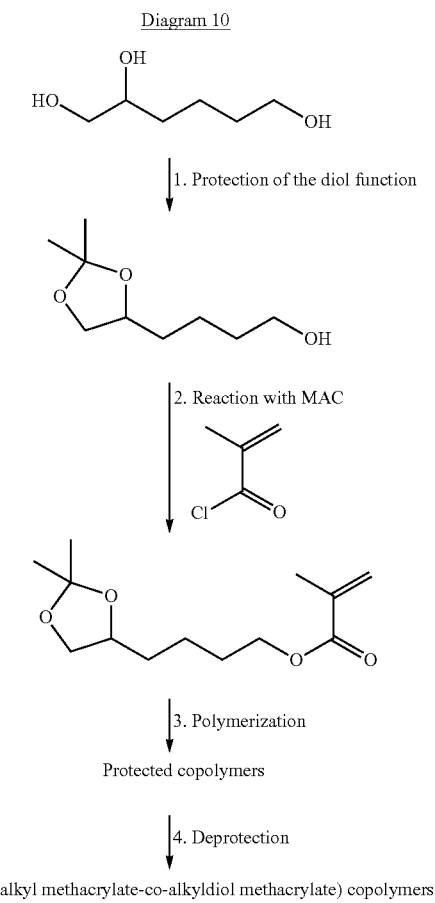

Diagram 10

1.1.1 Synthesis of the Monomer M1 Bearing a Diol Function Protected in Ketal Form The synthesis of a methacrylate monomer bearing a diol function protected in ketal form is carried out in two steps (steps 1 and 2 of reaction diagram 10) according to the protocol below:

$1^{st}$ Step:

42.1 g (314 mmol) of 1,2,6-hexane triol (1,2,6-HexTri) is introduced into a 1-L flask. 5.88 g of molecular sieve (4° A) is added followed by 570 mL of acetone. 5.01 g (26.3 mmol) of para-toluene-sulphonic acid (pTSA) is then slowly added. The reaction medium is left under stirring for 24 hours at ambient temperature. 4.48 g (53.3 mmol) of $NaHCO_3$ is then added. The reaction medium is left under stirring for 3 hours at ambient temperature before being filtered. The filtrate is then concentrated under vacuum by means of a rotary evaporator until a suspension of white crystals is obtained. 500 mL of water is then added to this suspension. The solution thus obtained is extracted with 4×300 mL of dichloromethane. The organic phases are combined and dried over $MgSO_4$. The solvent is then completely evaporated off under vacuum at 25° C. by means of a rotary evaporator.

$2^{nd}$ Step:

The product thus obtained is then introduced into a 1-L flask surmounted by a dropping funnel. The glassware used having been previously dried overnight in an oven thermostatically controlled at 100° C. 500 mL of anhydrous dichloromethane is then introduced into the flask followed by 36.8 g (364 mmol) of triethylamine. A solution of 39.0 g (373 mmol) of methacryloyl chloride (MAC) in 50 mL of anhydrous dichloromethane is introduced into the dropping funnel. The flask is then placed in an ice bath in order to lower the temperature of the reaction medium to around 0° C. The methacryloyl chloride solution is then added dropwise under vigorous stirring. Once the addition of the methacryloyl chloride is completed, the reaction medium is left under stirring at 0° C. for 1 hour, then at ambient temperature for 23 hours. The reaction medium is then transferred into a 3-L Erlenmeyer flask and 1 L of dichloromethane is added. The organic phase is then successively washed with 4×300 mL of water, 6×300 mL of a 0.5M aqueous solution of hydrochloric acid, 6×300 mL of a saturated aqueous solution of $NaHCO_3$ and again 4×300 mL of water. The organic phase is dried over $MgSO_4$, filtered then concentrated under vacuum using a rotary evaporator in order to produce 64.9 g (yield of 85.3%) of protected diol monomer in the form of a light yellow liquid the characteristics of which are as follows:

$^1$H NMR (400 MHz, CDCl3) δ: 6.02 (singlet, 1H), 5.47 (singlet, 1H), 4.08 (triplet, J=6.8 Hz, 2H), 4.05-3.98 (multiplet, 1H), 3.96 (doublet of doublets, J=6 Hz and J=7.6 Hz, 1H), 3.43 (doublet of doublets, J=7.2 Hz and J=7.2 Hz, 1H), 1.86 (doublet of doublets, J=1.2 Hz and J=1.6 Hz, 3H), 1.69-1.33 (multiplet, 6H), 1.32 (singlet, 3H), 1.27 (singlet, 3H).

1.1.2 Synthesis of Methacrylate Copolymers According to the Invention Bearing Diol Functions The synthesis of the methacrylate copolymers bearing diol functions according to the invention is carried out in two steps (steps 3 and 4 of reaction diagram 10):
  Copolymerization of two alkyl methacrylate monomers with a methacrylate monomer bearing a diol function protected in ketal form;
  Deprotection of the copolymer.

More precisely, the synthesis of the copolymer is carried out according to the following protocol:

10.5 g (31.0 mmol) of stearyl methacrylate (StMA), 4.76 g (18.7 mmol) of lauryl methacrylate (LMA), 3.07 g (12.7 mmol) of methacrylate bearing a diol function protected in ketal form obtained according to the protocol described in paragraph 1.1.1, 68.9 mg (0.253 mmol) of cumyl dithiobenzoate and 19.5 mL of anisole are introduced into a 100-mL Schlenk tube. The reaction medium is placed under stirring and 8.31 mg (0.0506 mmol) of azobisisobutyronitrile (AIBN) in solution in 85 μL of anisole is introduced into the Schlenk tube. The reaction medium is then degassed for 30 minutes by bubbling argon through it before being brought to 65° C. for a period of 16 hours. The Schlenk tube is placed in an ice bath in order to stop the polymerization, then the polymer is isolated by precipitation from methanol, followed by filtration and drying under vacuum at 30° C. overnight.

A copolymer is thus obtained, having a number-average molar weight ($M_n$) of 41,000 g/mol, a polydispersity index (PDI) of 1.22 and a number-average degree of polymerization ($DP_n$) of 167. These values are obtained respectively by steric exclusion chromatography using tetrahydrofuran as eluent and a polystyrene calibration and by monitoring the conversion to monomers during the copolymerization.

Deprotection of the copolymer is carried out according to the following protocol:

7.02 g of copolymer containing approximately 20% protected diol function obtained previously is introduced into a 500-mL Erlenmeyer flask. 180 mL of dioxane is added and the reaction medium is placed under stirring at 30° C. 3 mL of a 1M aqueous solution of hydrochloric acid, then 2.5 mL of an aqueous solution of hydrochloric acid, 35% by weight, are added dropwise. The reaction medium then becomes slightly opaque and 20 mL of THF is introduced in order to make the medium completely homogeneous and transparent. The reaction medium is then left under stirring at 40° C. for 48 hours. The copolymer is recovered by precipitation from methanol, filtration and drying under vacuum at 30° C. overnight.

A poly(alkyl methacrylate-co-alkyldiol methacrylate) copolymer is obtained, containing approximately 20 mol. % diol monomer units M1, and having an average pendant alkyl chain length of 13.8 carbon atoms.

1.2: Starting from a Monomer Bearing a Diol Function Protected in Boronic Ester Form In another embodiment, the statistical copolymer A1 of the invention is obtained according to the following reaction diagram 11:

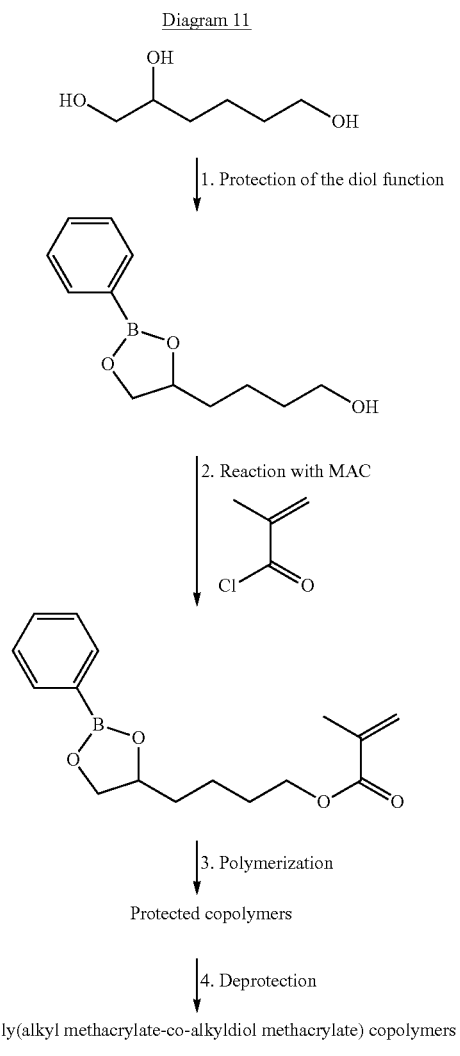

Diagram 11

1.2.1 Synthesis of the Monomer M1 Bearing a Diol Function Protected in Boronic Ester Form The synthesis of a methacrylate monomer bearing a diol function protected in ester form is carried out in two steps (steps 1 and 2 of Diagram 11) according to the following protocol:

$1^{st}$ Step:

6.01 g (49.3 mmol) of phenylboronic acid (PBA) and 300 mL of acetone are introduced into a 500-mL beaker, followed by 1.5 mL of water. The reaction medium is placed under stirring and 6.07 g (45.2 mmol) of 1,2,6-hexanetriol is added slowly. An excess of magnesium sulphate is added to the reaction medium in order to trap the water initially introduced as well as the water released by the condensation between the phenylboronic acid and the 1,2,6-hexanetriol. The reaction medium is left under stirring at ambient temperature for 30 minutes before being filtered then concentrated under vacuum by means of a rotary evaporator.

$2^{nd}$ Step:

The light yellow liquid thus obtained in the preceding step is then introduced into a 1-L flask surmounted by a dropping funnel. The glassware used having been pre-dried beforehand overnight in an oven thermostatically controlled at 100° C. 90 mL of anhydrous dichloromethane is then introduced into the flask followed by 6.92 g (68.4 mmol) of triethylamine. A solution of 5.82 g (55.7 mmol) of methacryloyl chloride (MAC) in 10 mL of anhydrous dichloromethane is introduced into the dropping funnel. The flask is then placed in an ice bath in order to lower the temperature of the reaction medium to around 0° C. The methacryloyl chloride solution is then added dropwise under vigorous stirring. Once the addition of the methacryloyl chloride is completed, the reaction medium is left under stirring at 0° C. for 1 hour, then at ambient temperature for 17 hours. The reaction medium is then transferred into a 500-mL Erlenmeyer flask and 300 mL of dichloromethane is added. The organic phase is then successively washed with 4×100 mL of water, 4×100 mL of a 0.1M aqueous solution of hydrochloric acid, 4×100 mL of a saturated aqueous solution of $NaHCO_3$ and again 4×100 mL of water. The organic phase is dried over $MgSO_4$, filtered then concentrated under vacuum using a rotary evaporator in order to produce 11.6 g (yield of 89%) of protected diol monomer in the form of a light yellow-coloured liquid the characteristics of which are as follows:

$^1$H NMR (400 MHz, CDCl3) δ: 7.81 (doublet of doublets, J=4 Hz and J=8 Hz, 2H), 7.48 (triplet of triplets, J=1.2 Hz and J=7.2 Hz, 1H), 7.38 (triplet of triplets, J=1.2 Hz and J=6.8 Hz, 1H), 6.10 (singlet, 1H), 5.55 (singlet, 1H), 4.63-4.53 (multiplet, 1H), 4.44 (doublet of doublets, J=7.6 Hz and J=8.8 Hz, 1H), 4.18 (triplet, J=6.8 Hz, 2H), 3.95 (doublet of doublets, J=6.8 Hz and J=8.8 Hz, 1H), 1.94 (doublet of doublets, J=1.2 Hz and J=1.6 Hz, 3H), 1.81-1.47 (multiplet, 6H)

1.2.2 Synthesis of Methacrylate Copolymers According to the Invention Bearing Diol Functions The synthesis of the methacrylate copolymers bearing diol functions according to the invention is carried out in two steps (steps 3 and 4 of Diagram 11):

Copolymerization of two alkyl methacrylate monomers with a methacrylate monomer bearing a diol function protected in boronic ester form;

Deprotection of the copolymer.

The following procedures describe the synthesis of a poly(alkyl methacrylate-co-alkyldiol methacrylate) copolymer containing approximately 10 mol. % of diol monomer units, and having an average pendant alkyl chain length of 13.8 carbon atoms. The synthesis of the polymer is carried out according to the following protocol:

13.5 g (40 mmol) of stearyl methacrylate (StMA), 12 g (47.2 mmol) of lauryl methacrylate (LMA), 3.12 g (10.8 mmol) of methacrylate bearing a diol function protected in boronic ester form, 92.1 mg (0.416 mmol) of cumyl dithiobenzoate and 34 mL of anisole are introduced into a 100-mL Schlenk tube. The reaction medium is placed under stirring and 13.7 mg (0.0833 mmol) of azobisisobutyronitrile (AIBN) in solution in 135 µL of anisole is introduced into the Schlenk tube. The reaction medium is then degassed for 30 minutes by bubbling argon through it before being brought to 65° C. for a period of 24 hours. The Schlenk tube is placed in an ice bath in order to stop the polymerization and 30 mL of tetrahydrofuran (THF) is then added to the reaction medium. The polymer is isolated by precipitation from cold methanol, followed by filtration and drying under vacuum at 30° C. overnight.

A copolymer is thus obtained, having a number-average molar weight ($M_n$) of 70,400 g/mol, a polydispersity index (PDI) of 3.11 and a number-average degree of polymerization ($DP_n$) of 228. These values are obtained respectively by steric exclusion chromatography using tetrahydrofuran as eluent and a polystyrene calibration and by monitoring the conversion to monomers during the copolymerization.

Deprotection of the copolymer is carried out according to the following protocol:

19 g of copolymer obtained in the preceding step and containing approximately 10% protected diol function is introduced into a 1-L Erlenmeyer flask. 250 mL of dichloromethane and 30 mL of an aqueous solution of hydrochloric acid are added. The reaction medium is stirred at ambient temperature for 24 hours before being poured dropwise into 1 L of aqueous solution of sodium hydroxide (pH=10) then stirred at ambient temperature for another 24 hours. Throughout this period of stirring, the reaction medium is composed of two phases. The organic phase is recovered using a separating funnel and the polymer is precipitated from cold methanol. The polymer thus obtained is re-dissolved in 100 ml of dichloromethane in order to be precipitated from cold methanol again. The polymer is recovered and dried under vacuum at 30° C. overnight.

A poly(alkyl methacrylate-co-alkyldiol methacrylate) copolymer is obtained containing approximately 10 mol. % diol monomer units, and having an average pendant alkyl chain length of 13.8 carbon atoms.

Synthesis of the Compounds A2 of the Invention

2.1: Synthesis of a Boronic Diester as Cross-Linking Agent

The synthesis of a compound A2 according to the invention is carried out according to the following protocol and according to reaction diagram 12:

Diagram 12

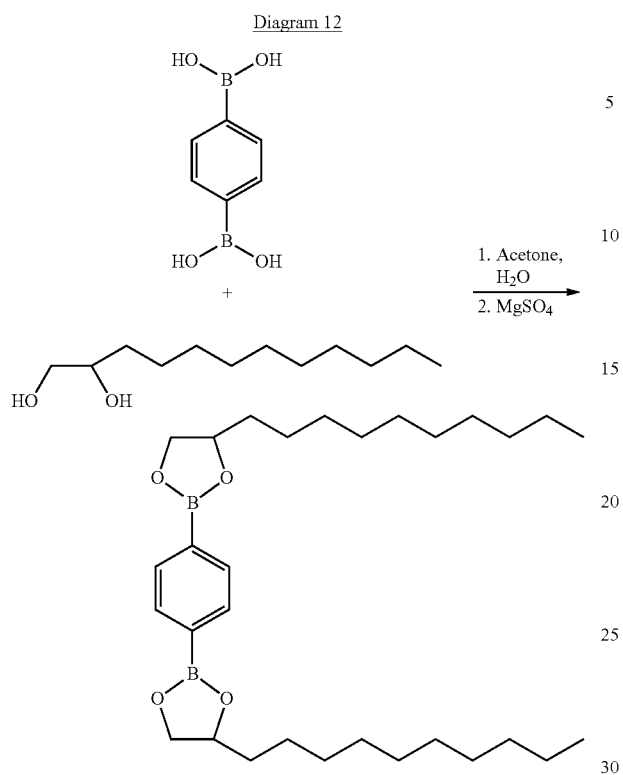

1,4 Benzenediboronic acid (1,4-BDBA) (1.5 g; 9.05 mmol) is introduced into a 500-mL beaker, followed by 300 mL of acetone. The reaction medium is placed under stirring and 0.300 g (16.7 mmol) of water is introduced dropwise. The reaction medium then becomes transparent and homogeneous and 1,2-dodecanediol (4.02 g; 19.9 mmol) is slowly added. After the latter is completely dissolved, an excess of magnesium sulphate is added in order to trap the water introduced initially as well as the water released by the condensation between the 1,4-BDBA and the 1,2-dodecanediol. After 15 minutes under stirring, the reaction medium is filtered. The solvent is then removed from the filtrate by means of a rotary evaporator, in order to produce 4.41 g of boronic diester and 1,2-dodecanediol (yield of 98%) in the form of a white solid.

The characteristics are as follows:

$^1$H NMR (400 MHz, CDCl3) Boronic diester: δ: 7.82 (singlet, 2H), 4.63-4.51 (multiplet, 2H), 4.42 (doublet of doublets, J=8 Hz and J=8.8 Hz, 2H), 3.95 (doublet of doublets, J=7.2 Hz and J=8.8 Hz, 2H), 1.81-1.31 (multiplet, 36H), 0.88 (triplet, J=7.2 Hz, 6H); 1,2-dodecanediol: δ: 3.85-3.25 (multiplet, approximately 2.17H), 1.81-1.31 (multiplet, approximately 13.02H), 0.88 (triplet, J=7.2 Hz, approximately 2.17H)

2.2: Synthesis of the Poly(Alkyl Methacylate-Co-Boronic Ester Monomer) Copolymer

2.2.1 Synthesis of the Boronic Ester Monomer

The boronic ester monomer of the invention is synthesized according to the following reaction diagram 13:

Diagram 13

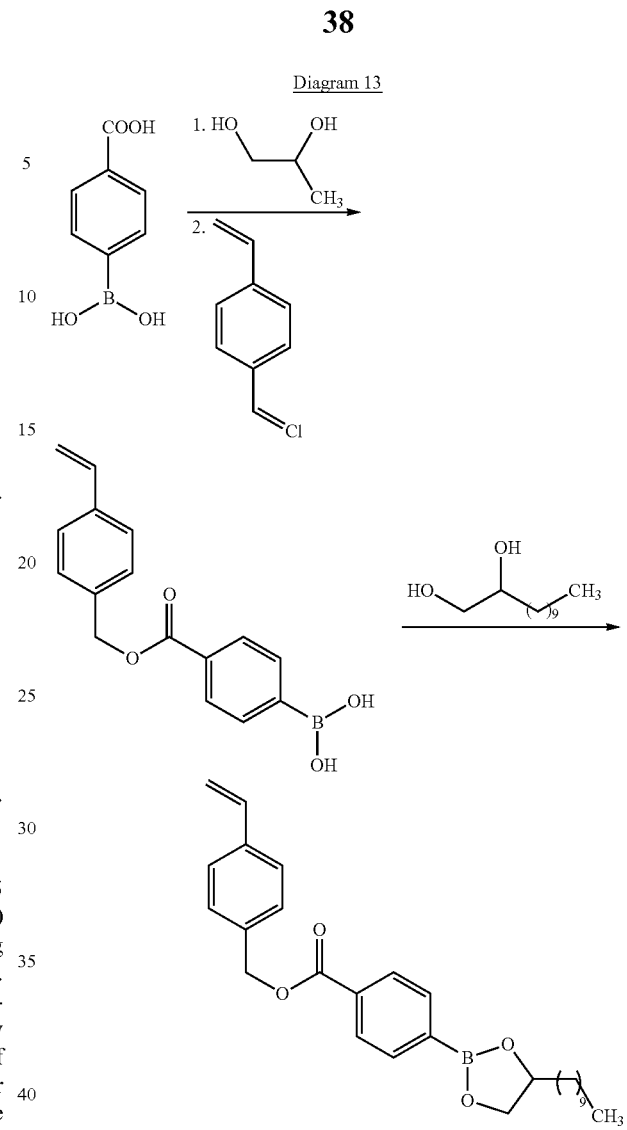

The monomer is obtained according to the two-step protocol:

The first step consists of synthesizing a boronic acid and the second step consists of obtaining a boronic ester monomer.

$1^{st}$ Step:

4-Carboxyphenylboronic acid (CPBA) (5.01 g; 30.2 mmol) is introduced into a 1-L beaker followed by 350 mL of acetone and the reaction medium is placed under stirring. 7.90 mL (439 mmol) of water is added dropwise until the 4-carboxyphenylboronic acid is completely dissolved. The reaction medium is then transparent and homogeneous. 1,2-Propanediol (2.78 g; 36.6 mmol) is then slowly added, followed by an excess of magnesium sulphate in order to trap the water initially introduced as well as the water released by the condensation between the CPBA and the 1,2-propanediol. The reaction medium is left under stirring for 1 hour at 25° C. before being filtered. The solvent is then removed from the filtrate by means of a rotary evaporator. The product thus obtained and 85 mL of DMSO are introduced into a 250-mL flask. The reaction medium is placed under stirring then after complete homogenization of the reaction medium, 8.33 g (60.3 mmol) of $K_2CO_3$ is added. 4-(Chloromethyl)styrene (3.34 g; 21.9 mmol) is then slowly introduced into the flask. The reaction medium is then left under stirring at 50° C. for 16 hours. The reaction medium is transferred into a 2-L Erlenmeyer flask, then 900 mL of water is added. The aqueous phase is extracted with 8×150 mL of ethyl acetate. The organic phases are combined, then extracted with 3×250 mL of water. The organic phase is dried over $MgSO_4$ and filtered. The solvent is removed from the filtrate by means of a rotary evaporator in order to produce the boronic acid monomer (5.70 g; yield of 92.2%) in the form of a white powder, the characteristics of which are as follows:

$^1$H NMR (400 MHz, CDCl3) δ: 7.98 (doublet, J=5.6 Hz, 4H), 7.49 (doublet, J=4 Hz, 4H), 6.77 (doublet of doublets, J=10.8 Hz and J=17.6 Hz, 1H), 5.83 (doublet of doublets, J=1.2 Hz and J=17.6 Hz, 1H), 5.36 (singlet, 2H), 5.24 (doublet of doublets, J=1.2 Hz and J=11.2 Hz, 1H).

2$^{nd}$ Step:

The boronic acid monomer (5.7 g; 20.2 mmol) obtained during the first step and 500 mL of acetone are introduced into a 1-L Erlenmeyer flask. The reaction medium is placed under stirring and 2.6 mL (144 mmol) of water is added dropwise until the boronic acid monomer is completely dissolved. The reaction medium is then transparent and homogeneous. A solution of 1,2-dodecanediol (5.32 g; 26.3 mmol) in 50 mL of acetone is slowly added to the reaction medium, followed by an excess of magnesium sulphate in order to trap the water initially introduced as well as the water released by the condensation between the boronic acid monomer and the 1,2-dodecanediol. After 3 hours under stirring at ambient temperature, the reaction medium is filtered. The solvent is then removed from the filtrate by means of a rotary evaporator in order to produce 10.2 g of a mixture of boronic ester monomer and 1,2-dodecanediol in the form of a light yellow solid.

The characteristics are as follows:

$^1$H NMR (400 MHz, CDCl3): Boronic ester monomer: δ: 8.06 (doublet, J=8 Hz, 2H), 7.89 (doublet, J=8 Hz, 2H), 7.51 (doublet, J=4 Hz, 4H), 6.78 (doublet of doublets, J=8 Hz and J=16 Hz, 1H), 5.84 (doublet of doublets, J=1.2 Hz and J=17.6 Hz, 1H), 5.38 (singlet, 2H), 5.26 (doublet of doublets, J=1.2 Hz and J=11.2 Hz, 1H), 4.69-4.60 (multiplet, 1H), 4.49 (doublet of doublets, J=8 Hz and J=9.2 Hz, 1H), 3.99 (doublet of doublets, J=7.2 Hz and J=9.2 Hz, 1H), 1.78-1.34 (multiplet, 18H), 0.87 (triplet, J=6.4 Hz, 3H); 1,2-dodecanediol: δ: 3.61-3.30 (multiplet, approximately 1.62H), 1.78-1.34 (multiplet, approximately 9.72H), 0.87 (triplet, J=6.4 Hz, approximately 1.62H)

In a variant of the synthesis, the boronic acid monomer obtained during the first step can be protected by 1,2-propanediol instead of 1,2-dodecanediol, following the following procedure:

The boronic acid monomer (3.5 g; 12.4 mmol) obtained during the first step and 250 mL of acetone are introduced into a 500-L Erlenmeyer flask. The reaction medium is placed under stirring and 1.8 mL (100 mmol) of water is added dropwise until the boronic acid monomer is completely dissolved. The reaction medium is then transparent and homogeneous. The 1,2-propanediol (1.08 g; 14.2 mmol) is slowly added to the reaction medium, followed by an excess of magnesium sulphate in order to trap the water initially introduced as well as the water released by the condensation between the boronic acid monomer and the 1,2-propanediol. After 2 hours under stirring at ambient temperature, the reaction medium is filtered. The solvent is then removed from the filtrate by means of a rotary evaporator in order to produce a mixture of boronic ester monomer and 1,2-propanediol in the form of a light yellow solid.

The characteristics are as follows:

1H NMR (400 MHz, CDCl3): Boronic ester monomer: δ: 8.06 (doublet, J=8 Hz, 2H), 7.87 (doublet, J=8 Hz, 2H), 7.42 (doublet, J=2 Hz, 4H), 6.72 (doublet of doublets, J=11 Hz and J=18 Hz, 1H), 5.76 (doublet of doublets, J=1 Hz and J=18 Hz, 1H), 5.35 (singlet, 2H), 5.26 (doublet of doublets, J=1 Hz and J=11 Hz, 1H), 4.77-4.68 (multiplet, 1H), 4.48 (doublet of doublets, J=8 Hz and J=9 Hz, 1H), 3.91 (doublet of doublets, J=8 Hz and J=9 Hz, 1H), 1.42 (doublet, J=6 Hz, 3H); 1,2-dodecanediol: δ: 3.66-3.37 (multiplet, approximately 0.26H), 1.17 (doublet, J=6 Hz, approximately 0.39H)

2.2.2 Synthesis of Compound A2, Poly(Alkyl Methacrylate-Co-Boronic Ester Monomer) Statistical Copolymer The statistical copolymer A2 of the invention is obtained according to the following protocol:

2.09 g of a previously prepared mixture of boronic ester monomer and 1,2-dodecanediol (containing 3.78 mmol of boronic ester monomer), 98.3 mg (0.361 mmol) of cumyl dithiobenzoate, 22.1 g (86.9 mmol) of lauryl methacrylate (LMA) and 26.5 mL of anisole are introduced into a 100-mL Schlenk tube. The reaction medium is placed under stirring and 11.9 mg (0.0722 mmol) of azobisisobutyronitrile (AIBN) in solution in 120 μL of anisole is introduced into the Schlenk tube. The reaction medium is then degassed for 30 minutes by bubbling argon through it before being brought to 65° C. for a period of 16 hours. The Schlenk tube is placed in an ice bath in order to stop the polymerization, then the polymer is isolated by precipitation from anhydrous acetone, followed by filtration and drying under vacuum at 30° C. overnight.

A copolymer is thus obtained, having the following structure:

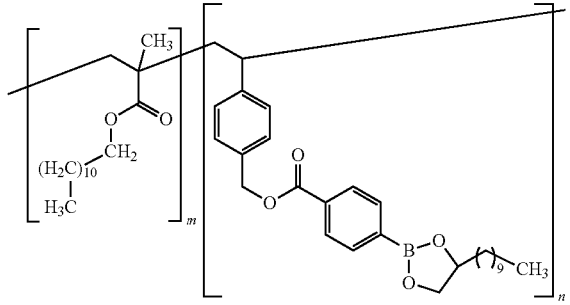

with m=0.96 and n=0.04.

The boronic ester copolymer obtained has a number-average molar weight ($M_n$) equal to 37,200 g/mol, a polydispersity index (PDI) equal to 1.24 and a number-average degree of polymerization ($DP_n$) equal to 166. These values are obtained respectively by steric exclusion chromatography using tetrahydrofuran as eluent and a polystyrene calibration and by monitoring the conversion to monomers during the copolymerization. NMR analysis of the proton of the final copolymer gives a composition of 4 mol. % boronic ester monomer and 96% lauryl methacrylate.

3. Rheological Studies of the Formulations of Polymers in Solution in a Base Oil of Group III According to the API Classification

3.1 Equipment and Protocols for Measuring Viscosity

The rheological studies were carried out using a stress-controlled Couette MCR 501 rheometer from the company Anton Paar. The measurements were carried out on formulations of polymers in solution in a Group III base oil using a cylindrical geometry of reference DG 26.7. The viscosity was measured as a function of the shear rate in the case of a temperature range varying from 10° C. to 110° C. For each temperature, the viscosity of the system was measured as a function of a shear rate of 0.01 to 1000 s$^{-1}$. The measurements of viscosity as a function of the shear rate at T=10° C., 20° C., 30° C., 50° C., 70° C., 90° C. and 110° C. were carried out (ranging from 10° C. to 110° C.) followed by new measurements at 10° C. and/or 20° C. in order to assess the reversibility of the systems. An average viscosity was then calculated for each temperature using the measurement points situated on the same plate.

The relative viscosity $$\left(\eta_{relative} = \frac{\eta_{solution}}{\eta_{base\ oil}}\right)$$

was also selected in order to represent the change in the viscosity of the system as a function of temperature, as this variable directly reflects the compensation for the loss of natural viscosity of the base oil of Group III of the polymer systems studied.

3.2: Compositions Based on Polydiol Statistical Copolymers A1 and Boronic Diester Compounds A2

Compositions Tested
Copolymers A1:
Four poly(alkyl methacrylate-co-alkyldiol methacrylate) statistical copolymers of the invention are tested. The copolymers are as follows:

Copolymer A1-1: This copolymer comprises 20 mol. % monomers having diol functions. The average side chain length is 13.8 carbon atoms. Its number-average molar weight is 49,600 g/mol. Its polydispersity index is 1.51. Its number-average degree of polymerization (DP$_n$) is 167. The number-average molar weight and the polydispersity index are measured by steric exclusion chromatography measurement using a polystyrene calibration.

Copolymer A1-2: This copolymer comprises 20 mol. % monomers having diol functions. The average side chain length is 10.8 carbon atoms. Its number-average molar weight is 59,700 g/mol. Its polydispersity index is 1.6. Its number-average degree of polymerization (DP$_n$) is 196. The number-average molar weight and the polydispersity index are measured by steric exclusion chromatography measurement using a polystyrene calibration.

Copolymer A1-3: This copolymer comprises 10 mol. % monomers having diol functions. The average side chain length is 13.8 carbon atoms. Its number-average molar weight is 47,800 g/mol. Its polydispersity index is 1.3. Its number-average degree of polymerization (DP$_n$) is 198. The number-average molar weight and the polydispersity index are measured by steric exclusion chromatography measurement using a polystyrene calibration.

Copolymer A1-4: This copolymer comprises 10 mol. % monomers having diol functions. The average side chain length is 13.8 carbon atoms. Its number-average molar weight is 97,100 g/mol. Its polydispersity index is 3.11. Its number-average degree of polymerization (DP$_n$) is 228. The number-average molar weight and the polydispersity index are measured by steric exclusion chromatography measurement using a polystyrene calibration.

The copolymers A1-1, A1-2, A1-3 and A1-4 are obtained according to one of the protocols described in paragraph 1.

Compound A2:
Compound A2-1 is the boronic diester obtained according to the protocol described in paragraph 2.1.

Lubricating Base Oil
The lubricating base oil used in the compositions to be tested is an oil of Group III of the API classification, marketed by SK under the name Yubase 4. It has the following characteristics:

its kinematic viscosity at 40° C. measured according to the standard ASTM D445 is 19.57 cSt;
its kinematic viscosity measured at 100° C. according to the standard ASTM D445 is 4.23 cSt;
its viscosity index measured according to the standard ASTM D2270 is 122;
its Noack volatility in percentage by weight, measured according to the standard DIN 51581 is 14.5;
Its flash point in degrees Celsius measured according to the standard ASTM D92 is 230° C.;
Its pour point in degrees Celsius measured according to the standard ASTM D97 is −15° C.

Composition A (not according to the invention) is used as reference.

It contains a solution with 4.2% by weight of a polymethacrylate polymer in a lubricating base oil of Group III of the API classification. The polymer has a number-average molar weight (M$_n$) equal to 106,000 g/mol, a polydispersity index (PDI) equal to 3.06, a number-average degree of polymerization of 466 and the average pendant chain length is 14 carbon atoms. This polymethacrylate is used as viscosity index improver additive.

4.95 g of a formulation having a concentration by weight of 42% of this polymethacrylate in a Group III base oil and 44.6 g of Group III base oil are introduced into a flask. The solution thus obtained is maintained under stirring at 90° C. until the polymethacrylate is completely dissolved. A solution with 4.2% by weight this polymethacrylate is obtained.

Composition B-1 (not according to the invention) is obtained as follows:

4.14 g of polydiol copolymer A1-1 and 37.2 g of Group III base oil are introduced into a flask. The solution thus obtained is maintained under stirring at 90° C. until the polydiol is completely dissolved. A solution with 10% by weight polydiol copolymer A1-1 is obtained.

Composition C-1 (according to the invention) is obtained as follows:

8 g of the solution with 10% by weight polydiol copolymer A1-1 in the Group III base oil prepared previously is introduced into a flask. 55.8 mg of boronic diester A2-1 is added to this solution. The solution thus obtained is maintained under stirring at 90° C. until the boronic diester is completely dissolved. A solution with 10% by weight polydiol copolymer A1-1 and 20 mol. % boronic diester A2-1 with respect to the diol functions of the polydiol copolymer A1-1 is obtained.

Composition D-1 (according to the invention) is obtained as follows:

8 g of the solution with 10% by weight polydiol copolymer A1-1 in the Group III base oil prepared previously is introduced into a flask. 223 mg of boronic diester A2-1 is added to this solution. The solution thus obtained is maintained under stirring at 90° C. until the boronic diester is completely dissolved. A solution with 10% by weight polydiol copolymer A1-1 and 80 mol. % boronic diester A2-1 with respect to the diol functions of the polydiol copolymer A1-1 is obtained.

Composition B-2 (not according to the invention) is obtained as follows:

6.52 g of polydiol copolymer A1-2 and 58.7 g of Group III base oil are introduced into a flask. The solution thus obtained is maintained under stirring at 90° C. until the polydiol is completely dissolved. A solution with 10% by weight polydiol copolymer A1-2 is obtained.

Composition C-2 (according to the invention) is obtained as follows:

8 g of the solution with 10% by weight polydiol copolymer A1-2 in the Group III base oil prepared previously is introduced into a flask. 65.4 mg of boronic diester A2-1 is added to this solution. The solution thus obtained is maintained under stirring at 90° C. until the boronic diester is completely dissolved. A solution with 10% by weight polydiol copolymer A1-2 and 20 mol. % boronic diester A2-1 with respect to the diol functions of the polydiol copolymer A1-2 is obtained.

Composition D-2 (according to the invention) is obtained as follows:

8 g of the solution with 10% by weight polydiol copolymer A1-2 in the Group III base oil prepared previously is introduced into a flask. 262 mg of boronic diester A2-1 is added to this solution. The solution thus obtained is maintained under stirring at 90° C. until the boronic diester is completely dissolved. A solution with 10% by weight polydiol copolymer A1-2 and 80 mol. % boronic diester A2-1 with respect to the diol functions of the polydiol copolymer A1-2 is obtained.

Composition B-3 (not according to the invention) is obtained as follows:

7.24 g of polydiol copolymer A1-3 and 65.2 g of Group III base oil are introduced into a flask. The solution thus obtained is maintained under stirring at 90° C. until the polydiol is completely dissolved. A solution with 10% by weight polydiol copolymer A1-3 is obtained.

Composition C-3 (according to the invention) is obtained as follows:

8 g of the solution with 10% by weight polydiol copolymer A1-3 in the Group III base oil prepared previously is introduced into a flask. 28.2 mg of boronic diester A2-1 is added to this solution. The solution thus obtained is maintained under stirring at 90° C. until the boronic diester is completely dissolved. A solution with 10% by weight polydiol copolymer A1-3 and 20 mol. % boronic diester A2-1 with respect to the diol functions of the polydiol copolymer A1-3 is obtained.

Composition B-4 (not according to the invention) is obtained as follows:

4.99 g of polydiol copolymer A1-4 and 44.4 g of Group III base oil are introduced into a flask. The solution thus obtained is maintained under stirring at 90° C. until the polydiol is completely dissolved. A solution with 10% by weight polydiol copolymer A1-4 is obtained.

Composition C-4 (according to the invention) is obtained as follows:

6.01 g of the solution with 10% by weight polydiol copolymer A1-4 in the Group III base oil prepared previously is introduced into a flask. 18.6 mg of boronic diester A2-1 is added to this solution. The solution thus obtained is maintained under stirring at 90° C. until the boronic diester is completely dissolved. A solution with 10% by weight polydiol copolymer A1-4 and 20 mol. % boronic diester A2-1 with respect to the diol functions of the polydiol copolymer A1-4 is obtained.

Composition D-4 (according to the invention) is obtained as follows:

6.03 g of the solution with 10% by weight polydiol copolymer A1-4 in the Group III base oil prepared previously is introduced into a flask. 74.7 mg of boronic diester A2-1 is added to this solution. The solution thus obtained is maintained under stirring at 90° C. until the boronic diester is completely dissolved. A solution with 10% by weight polydiol copolymer A1-4 and 80 mol. % boronic diester A2-1 with respect to the diol functions of the polydiol copolymer A1-4 is obtained.

Rheology Results Obtained

Figure 5:
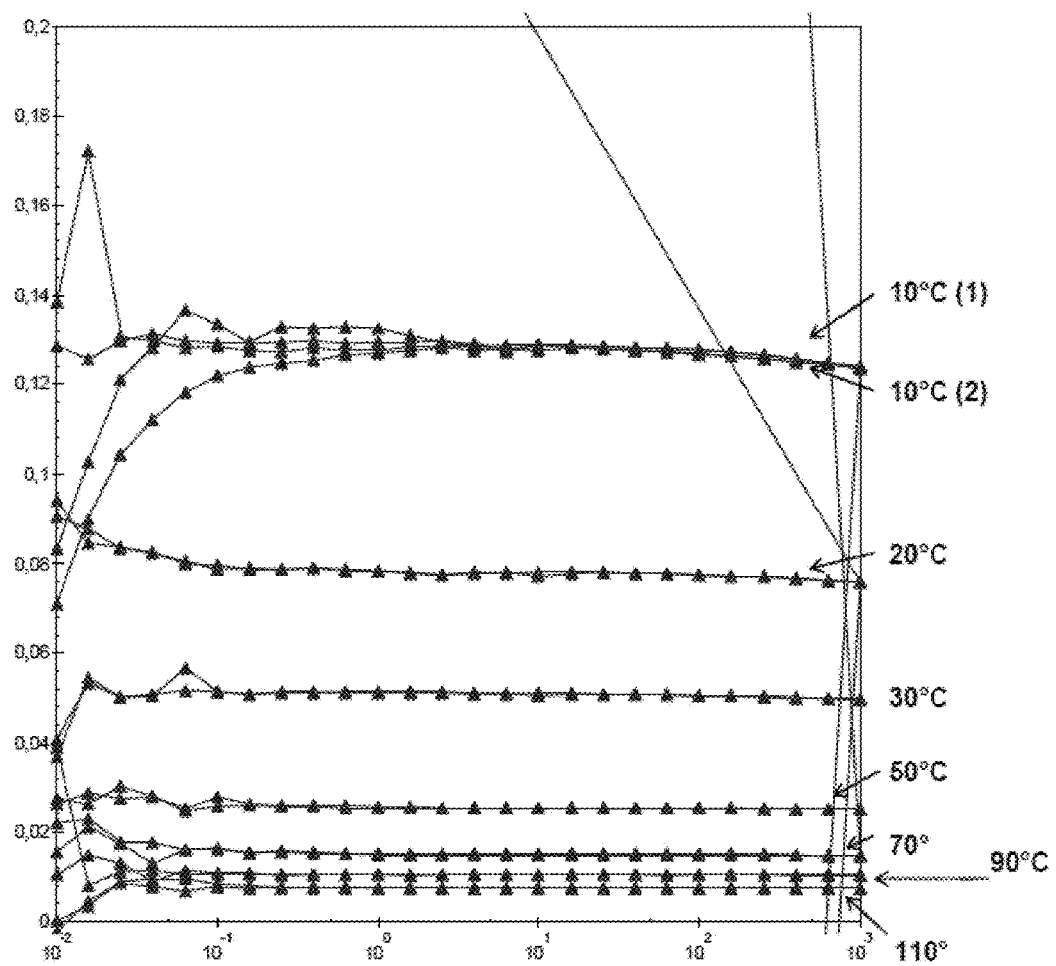
FIG. 5 shows the variation, for different temperatures comprised between 10° C. and 110° C., of the viscosity (Pa·s, y-axis) as a function of the shear rate ($s^{-1}$, x-axis) of a solution at 10% by weight of a polydiol statistical copolymer A1-1 and 0.77% by weight of a diboronic ester compound A2-1 in the group III base oil.
Figure 6A:
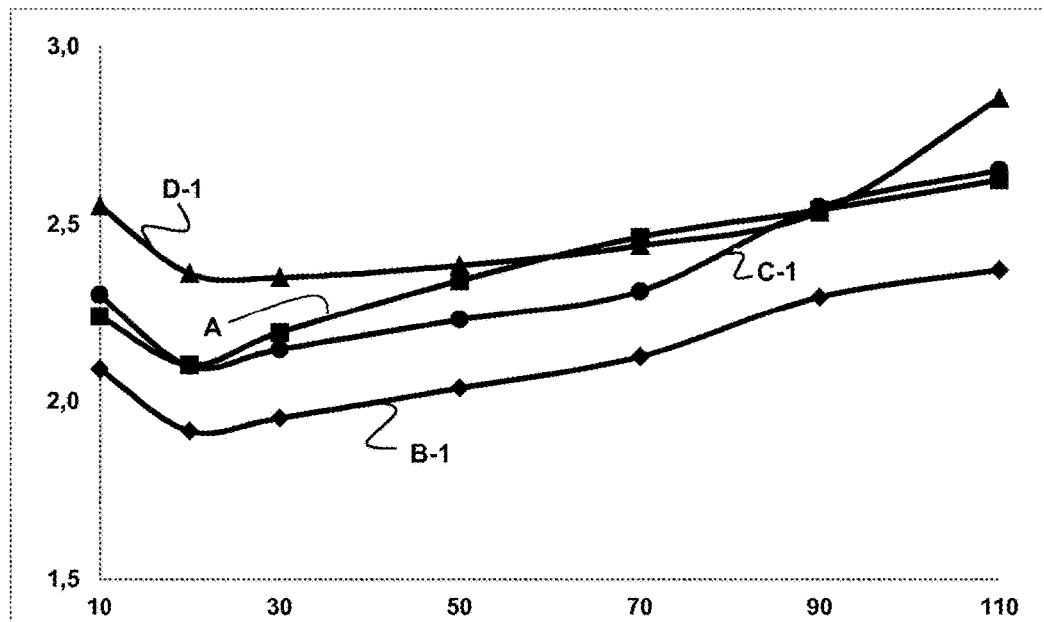
FIG. 6A shows the change in the relative viscosity (without units, y-axis) as a function of the temperature (° C., x-axis) of the compositions A, B-1, C-1 and D-1.
Figure 6B:
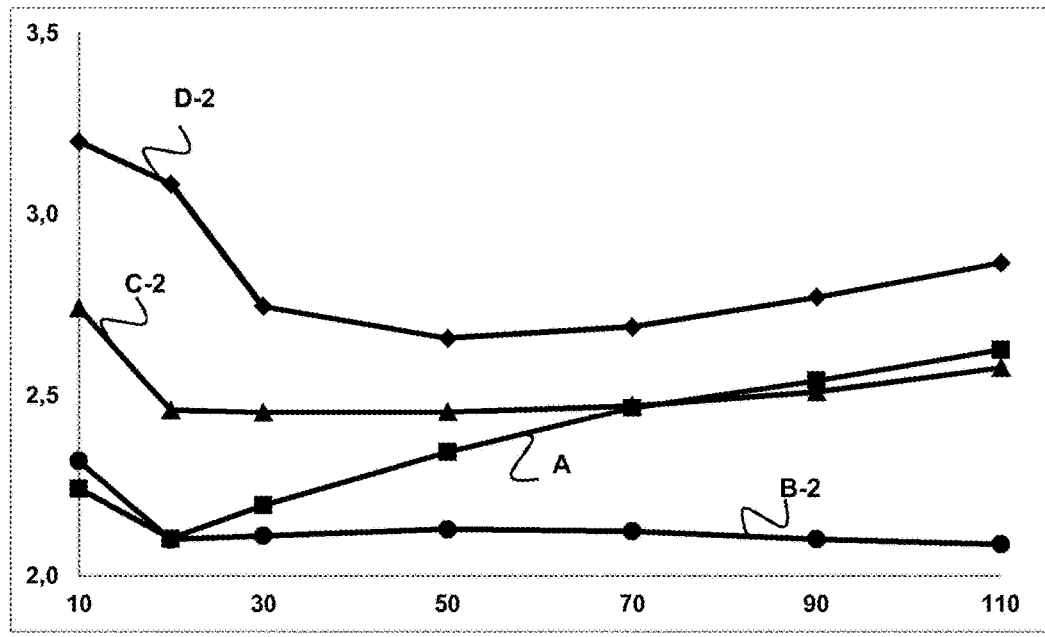
FIG. 6B shows the change in the relative viscosity (without units, y-axis) as a function of the temperature (° C., x-axis) of the compositions A, B-2, C-2 and D-2.
Figure 6C:
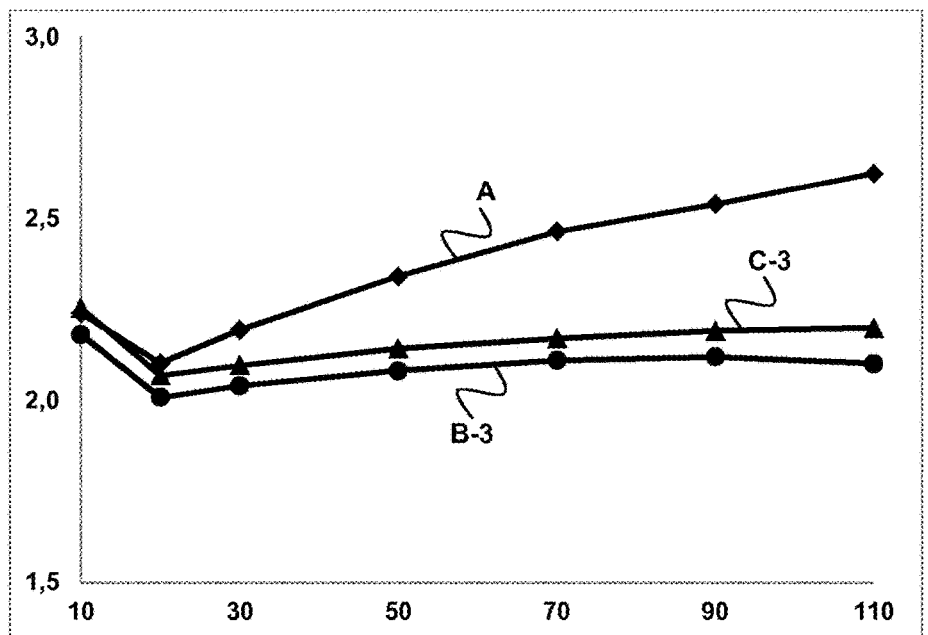
FIG. 6C shows the change in the relative viscosity (without units, y-axis) as a function of the temperature (° C., x-axis) of the compositions A, B-3 and C-3.
Figure 6D:
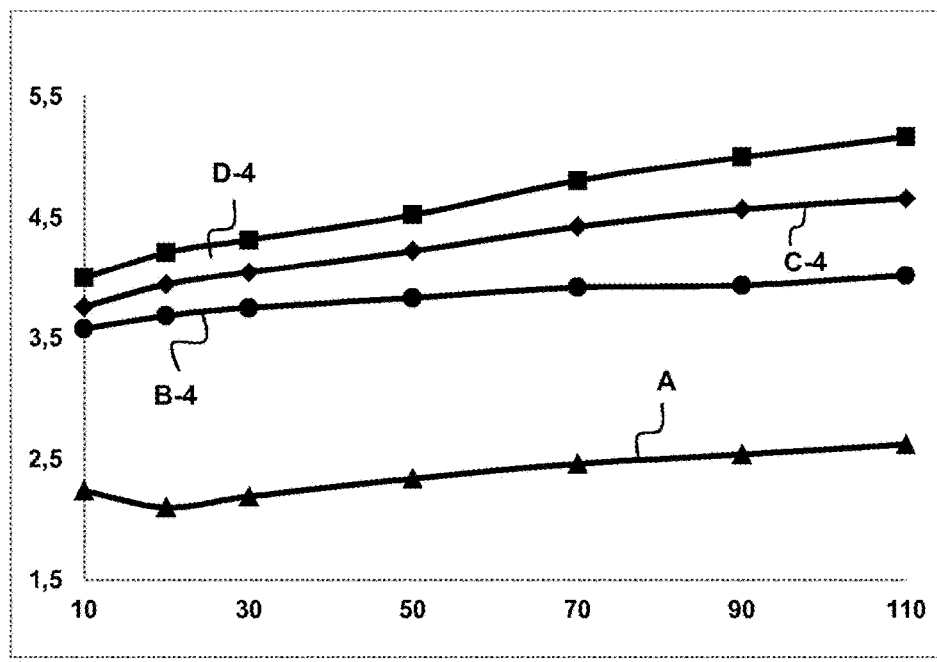
FIG. 6D shows the change in the relative viscosity (without units, y-axis) as a function of the temperature (° C., x-axis) of the compositions A, B-4, C-4 and D-4.

The rheological behaviour of composition C1-1 was studied in the case of a temperature range from 10° C. to 110° C. The results are presented in FIG. 5. The dynamic viscosity of composition C1-1 varies at low shear rates and for temperatures below 50° C. Composition C1-1 deforms under shear stress at temperatures below 50° C.

In the case of temperatures above 50° C., the dynamic viscosity of composition C1-1 varies very slightly or does not vary at low shear rates. Composition C1-1 no longer deforms under shear stress at these temperatures.

The relative viscosity of compositions A, B-1, C-1, D-1, B-2, C-2, D-2, B-3, C-3, D-3, B-4, C-4, D-4 was studied. The change in the relative viscosity of these compositions is illustrated in FIGS. 6A-6D. By comparing the results obtained, it is observed that certain parameters influence the relative viscosity of the compositions.

The Influence of $L_C$ (Average Pendant Side Chain Length)

The polydiol copolymers A1-1 and A1-2 have the same percentage of diol monomer M1 per chain, comparable molar weights, but a different average alkyl chain length of the monomers ($L_C$=13.8 and $L_C$=10.8 respectively). The change in the relative viscosity as a function of the temperature for the solutions formulated from these polymers (FIGS. 6A and 6B) indicates that the average alkyl chain length of the monomers constituting the polydiol copolymer plays a role in the rheological properties of the formulations.

The Influence of the Molar Percentage of Diol Monomer (% Diol)

The polydiol copolymers A1-1 and A1-3 have the same average alkyl chain length ($L_C$), comparable molar weights but a different percentage of diol monomer M1 per backbone chain (20% and 10% respectively). The change in the relative viscosity as a function of the temperature for the solutions formulated from these polymers (FIGS. 6A and 6C) indicates that the percentage of diol monomer per backbone chain plays a role in the rheological properties of the formulations.

The influence of the molar weights and degrees of polymerization ($DP_n$)

The polydiols A1-3 and A1-4 have the same percentage of diol monomer M1 per chain, the same average alkyl chain length ($L_C$) but molar weights (47,800 g/mol and 97,100 g/mol respectively) and substantially different number-average degrees of polymerization ($DP_n$ of 198 and 228 respectively). The change in the relative viscosity as a function of the temperature for the solutions formulated from these polymers (FIGS. 6.C and 6.D) indicates that the molar weight of the polydiol copolymers (Mn) plays a role in the rheological properties of the formulations.

3.2: Compositions Based on Polydiol Statistical Copolymers A1 and Boronic Ester Polymer Compounds A2

Figure 7:
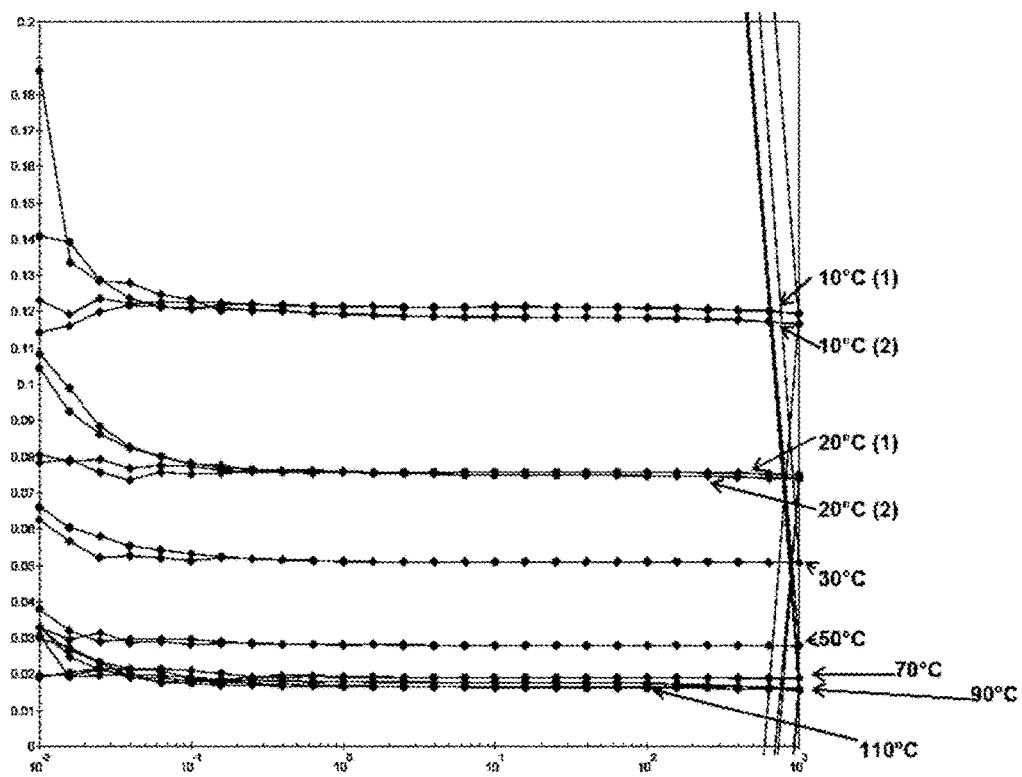
FIG. 7 shows the variation, for different temperatures comprised between 10° C. and 110° C., in the viscosity (Pa·s, y-axis) as a function of the shear rate ($s^{-1}$, x-axis) of the composition E.
Figure 8:
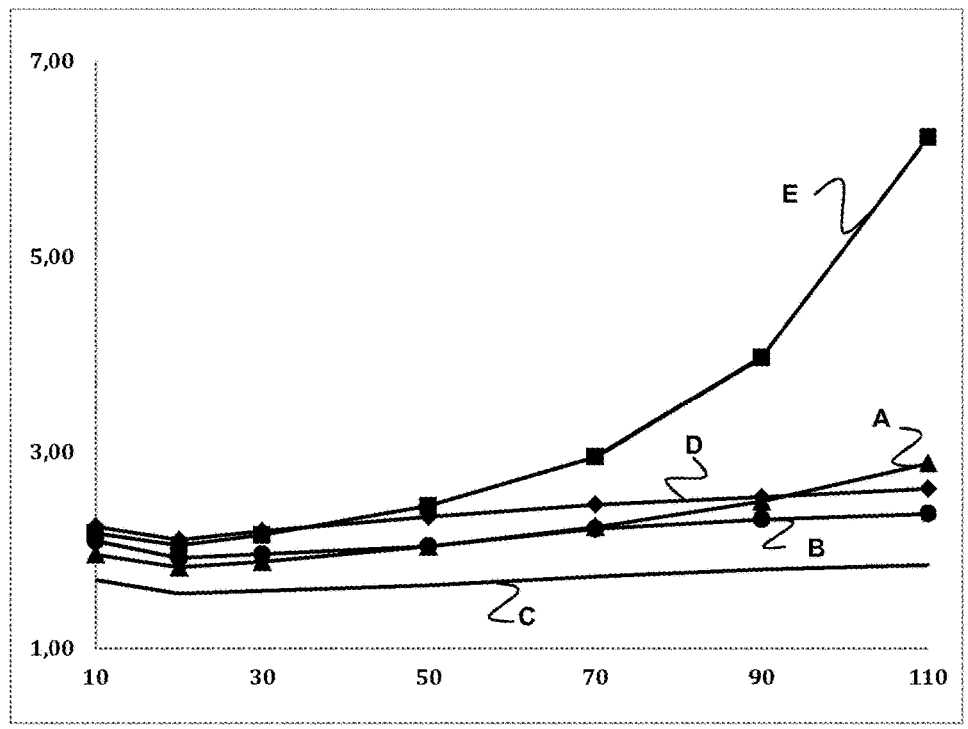
FIG. 8 shows the change in the relative viscosity (without units, y-axis) as a function of the temperature (° C., x-axis) of the compositions A, B, C, D and E.

Compositions Tested
Copolymers A1:
A poly(alkyl methacrylate-co-alkyldiol methacrylate) statistical copolymer of the invention is tested. The copolymer is as follows:
Copolymer A1-1: This copolymer comprises 20 mol. % monomers having diol functions. The average side chain length is 13.8 carbon atoms. Its number-average molar weight is 49,600 g/mol. Its polydispersity index is 1.51. Its number-average degree of polymerization ($DP_n$) is 167. The number-average molar weight and the polydispersity index are measured by steric exclusion chromatography measurement using a polystyrene calibration.
Copolymer A1-1 is obtained according to one of the protocols described in paragraph 1.
Compound A2:
Compound A2-2 is the boronic ester polymer obtained according to the protocol described in paragraph 2.2. This copolymer comprises 4 mol. % monomers having boronic ester functions. The average side chain length is greater than 12 carbon atoms. Its number-average molar weight is 37,200 g/mol. Its polydispersity index is 1.24. Its number-average degree of polymerization ($DP_n$) is 166. The number-average molar weight and the polydispersity index are measured by steric exclusion chromatography measurement using a polystyrene calibration.
Lubricating Base Oil
The lubricating base oil used in the compositions to be tested is the Group III oil described previously in paragraph 3.1.
The composition A (not according to the invention) used as reference is the same as the composition A used in paragraph 3.1.
Composition B (not according to the invention) is obtained as follows:
Composition B is the same composition B-1 used in paragraph 3.1.
Composition C (according to the invention) is obtained as follows:
4 g of the solution with 10% by weight polydiol copolymer A1-1 in the Group III base oil prepared previously is introduced into a flask. 76.8 mg of boronic ester polymer A2-2 and 4 g of the Group III base oil are added to this solution. The solution thus obtained is maintained under stirring at 90° C. until the boronic ester polymer is completely dissolved. A solution with 5% by weight polydiol copolymer A1-1 and 1% by weight boronic ester polymer A2-2 with respect to the total weight of the composition is obtained.
Composition D (according to the invention) is obtained as follows:
6 g of the preceding composition C (i.e. a composition at 5% by weight polydiol copolymer A1-1 and 1% by weight boronic ester polymer A2-2 with respect to the total weight of the composition) is introduced into a flask. 61.9 mg of boronic ester polymer A2-2 is added to this solution. The solution thus obtained is maintained under stirring at 90° C. until the boronic ester polymer is completely dissolved. A solution with 5% by weight polydiol copolymer A1-1 and 2% by weight boronic ester polymer A2-2 with respect to the total weight of the composition is obtained.
Composition E (according to the invention) is obtained as follows:
3 g of the solution with 10% by weight polydiol copolymer A1-1 in the Group III base oil prepared previously is introduced into a flask. 176 mg of boronic ester polymer A2-2 and 3 g of the Group III base oil are added to this solution. The solution thus obtained is maintained under stirring at 90° C. until the boronic ester polymer is completely dissolved. A solution with 5% by weight polydiol copolymer A1-1 and 3% by weight boronic ester polymer A2-2 with respect to the total weight of the composition is obtained.
Rheology Results Obtained
The rheological behaviour of composition E was studied in the case of a temperature range from 10° C. to 110° C. The results are presented in FIG. 7. The dynamic viscosity of composition E varies at low shear rates and for temperatures below 50° C. Composition E deforms under shear stress at temperatures below 50° C. In the case of temperatures above 50° C., the dynamic viscosity of composition E varies very slightly or does not vary at low shear rates. Composition E no longer deforms under shear stress at these temperatures.
The relative viscosity of compositions A, B, C, D and E was studied. The change in the relative viscosity of these compositions is illustrated in FIG. 8. This figure indicates that the polydiol/poly(boronic ester) systems make it possible to very significantly compensate for the drop in natural viscosity of the base oil as a function of the temperature. Furthermore, the effect obtained can be regulated by adjusting the concentrations by weight of the different polymers in solution in the base oil III.

4 Synthesis of Poly(Styrene-Alkyldiol Methacrylate) Statistical Copolymers A1

The synthesis of the styrene-methacrylate copolymers bearing diol functions according to the invention is carried out in two steps:
Copolymerization of the styrene monomer with a methacrylate monomer bearing a diol function protected in the ketal form;
Deprotection of the diol functions of the copolymer
The following procedures describe the synthesis of a poly(styrene-co-alkyldiol methacrylate) copolymer containing approximately 10 mol. % diol monomer units. More precisely, the synthesis of the copolymer is carried out according to the following protocol:
3.03 g (12.50 mmol) of hexyldiol methacrylate monomer bearing a diol function protected in ketal form obtained according to the protocol described in paragraph 1.1.1, 11.6 g (111.7 mmol) of styrene and 50.8 mg of 2-phenyl-2-propyl benzodithioate (0.187 mmol) in solution in 0.89 g of anisole are introduced into a 100-mL Schlenk tube. The reaction medium is then placed under stirring then degassed for 30 minutes by bubbling nitrogen through it before being brought to 120° C. for a period of 30 hours. The Schlenk tube is then placed in a cold water bath in order to stop the polymerization and 20 mL of tetrahydrofuran is then added to the reaction medium. The polymer is isolated by precipitation from methanol at ambient temperature, followed by filtration and drying under vacuum at 30° C. for 17 hours.

A copolymer is thus obtained, having a number-average molar weight (Mn) of 39,600 g/mol equivalent of polystyrene, a polydispersity index (PDI) of 1.47 and a number-average degree of polymerization of 541 (89 mol. % styrene). These values are obtained respectively by steric exclusion chromatography using tetrahydrofuran as eluent and polystyrene calibration, and by NMR monitoring of the conversion to monomers during the polymerization.

Deprotection of the copolymer is carried out according to the following protocol:

9.72 g of copolymer obtained in the preceding step and containing approximately 10% protected functions diol is introduced into a 500-mL flask containing 280 mL of dioxane in order to solubilize the polymer. 36 mL of an aqueous solution of hydrochloric acid (1 mol/L) is added. The medium then becomes completely opaque. After 24 hours under stirring at 25° C., the medium has again become transparent. 1.5 mL of hydrochloric acid (36% by weight) is then added to the medium before the latter is left under stirring at 25° C. for 24 hours. Once the deprotection is completed, the medium again becomes perfectly transparent. The polymer is isolated by two successive precipitations from methanol at ambient temperature, followed by filtration and drying under vacuum at 30° C. for 17 hours.

A poly(styrene-co-alkyldiol methacrylate) copolymer having a number-average molar weight (Mn) of 43,800 g/mol equivalent of polystyrene, a polydispersity index (PDI) of 1.34 is obtained.

5 Synthesis of Poly(Styrene-Phenylboronic Ester Styrene) Statistical Copolymers A2

The synthesis of another compound A2, styrene-phenylboronic ester styrene copolymer, is carried out according to the following protocol:

1.00 g of a mixture of boronic ester monomer and 1,2-propanediol previously prepared in accordance with paragraph 2.2.1 (containing 3.06 mmol of boronic ester monomer), 8.59 g (82.5 mmol) of styrene and 33.5 mg of 2-phenyl-2-propyl benzodithioate (0.123 mmol) in solution in 0.59 g of anisole are introduced into a 30-mL Schlenk tube. The reaction medium is then placed under stirring then degassed for 30 minutes by bubbling nitrogen through it before being brought to 120° C. for a period of 24 hours. The Schlenk tube is placed in a cold water bath in order to stop the polymerization and 15 mL of tetrahydrofuran is then added to the reaction medium. The polymer is isolated by precipitation in hexane at ambient temperature, followed by filtration and drying under vacuum at 30° C. for 17 hours.

A copolymer is thus obtained, having a number-average molar weight (Mn) of 35,200 g/mol, a polydispersity index (PDI) of 1.31 and a number-average degree of polymerization of 528 (96 mol. % styrene). These values are obtained respectively by steric exclusion chromatography using tetrahydrofuran as eluent and a polystyrene calibration, and by NMR monitoring of the conversion to monomers during the polymerization.

6. Rheological Studies of the Formulations of Polymers in Solution in Tetralin 6.1 Equipment and Protocols for Measuring Viscosity The rheological studies were carried out using a stress-controlled Couette MCR 302 rheometer from the company Anton Paar. The rheology measurements were carried out using a cylindrical geometry of reference DG 26.7. The viscosity was measured as a function of the shear rate in the case of a temperature range varying from 50° C. to 100° C. For each temperature, the viscosity of the system was measured as a function of the shear rate from 0.1 to 200 s$^{-1}$ for the study of tetralin alone and from 1 to 500 s$^{-1}$ for compositions A and B. The measurements of viscosity as a function of the shear rate at T=50° C., 60° C., 70° C., 80° C., 90° C. and 100° C. were carried out (ranging from 50° C. to 100° C.). An average viscosity was then calculated for each temperature using the measurement points situated on the same plate.

The relative viscosity $$\left(\eta_{relative} = \frac{\eta_{solution}}{\eta_{base\ oil}}\right)$$

was selected to represent the change in the viscosity of the system as a function of temperature, as this variable directly reflects the compensation of the polymer systems studied for the loss of natural viscosity of the tetralin.

6.2 Compositions in Tetralin

Tetralin 1,2,3,4-Tetrahydronaphthalene, also called tetralin, used in the compositions to be tested is a low-volatility apolar hydrocarbon solvent. It has the following characteristics according to the information given by the supplier:

Its density is 0.966;

Its melting point is −36° C.;

Its boiling point is located between 206 and 207° C.;

Its flash point is 77° C.

Copolymer A1-5

This copolymer comprises 10 mol. % monomers having diol functions and 90 mol. % styrene monomers. Its number-average molar weight is 43,800 g/mol. Its polydispersity index is 1.34. The number-average molar weight and the polydispersity index are measured by steric exclusion chromatography using a polystyrene calibration. This copolymer is obtained according to the process described in paragraph 4.

Copolymer A2-3

This copolymer comprises 4 mol. % monomers having boronic ester functions and 96 mol. % styrene monomers. Its number-average molar weight is 35,200 g/mol. Its polydispersity index is 1.31. The number-average molar weight and the polydispersity index are measured by steric exclusion chromatography using a polystyrene calibration. This copolymer is obtained according to the process described in paragraph 5.

Stock Solution B-5

1.00 g of polydiol copolymer A1-5 and 19.00 g of tetralin are introduced into a flask. The solution thus obtained is maintained under stirring at ambient temperature for 4 hours until the polydiol A1-5 is completely dissolved. A solution containing 5% polydiol copolymer A1-5 by weight is obtained.

Stock Solution C-5

1.00 g of poly(boronic ester) copolymer A2-3 and 19.00 g of tetralin are introduced into a flask. The solution thus obtained is maintained under stirring at ambient temperature for 4 hours until the poly(boronic ester) A2-3 is completely dissolved. A solution containing 5% poly(boronic ester) copolymer A2-3 by weight is obtained.

Composition F 0.1 mL of stock solution C-5 containing 5% poly(boronic ester) copolymer A2-3 by weight in the tetralin prepared previously is introduced into a flask to which 0.9 mL of tetralin is added. The solution is left under stirring for 2 minutes in an oil bath heated at 90° C. 4 mL of the stock solution B-5 containing 5% polydiol copolymer A1-5 by weight is then added to this solution leaving the flask in the bath and under stirring. The solution thus obtained is maintained under stirring at 90° C. for an hour. A solution containing 4% polydiol copolymer A1-5 by weight and 0.1% poly(boronic ester) copolymer A2-3 by weight is obtained.

Composition G 0.3 mL of stock solution C-5 containing 5% copolymer poly(boronic ester) A2-3 by weight in the tetralin prepared previously is introduced into a flask to which 1.7 mL of tetralin is added. The solution is left under stirring for 2 minutes in an oil bath heated at 50° C. 3 mL of the stock solution B-5 containing 5% polydiol copolymer A1-5 by weight is then added to this solution leaving the flask in the bath and under stirring. The solution thus obtained is maintained under stirring at 50° C. for an hour. A solution containing 3% polydiol copolymer A1-5 by weight and 0.3% poly(boronic ester) copolymer A2-3 by weight is obtained.

6.3 Rheology Results

Figure 10:
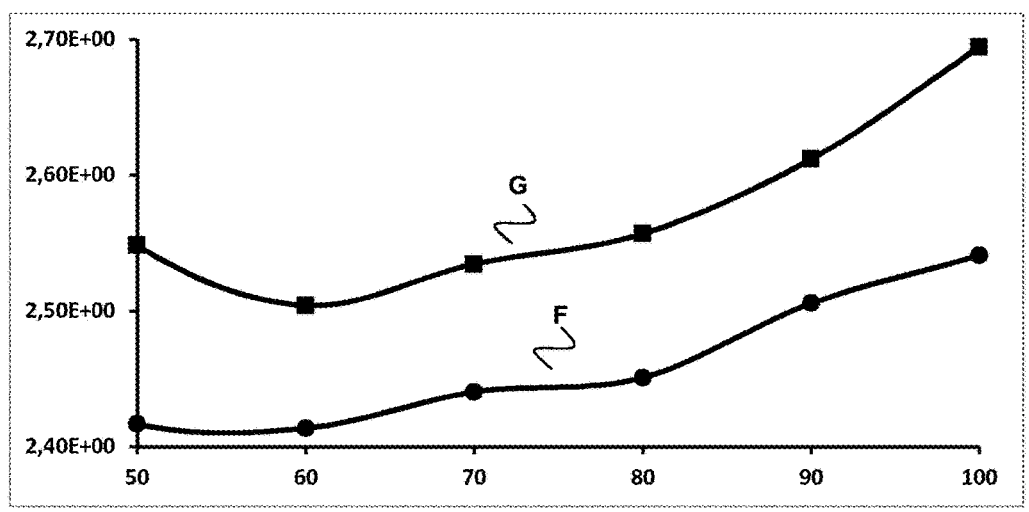
FIG. 10 shows the change in the relative viscosity (without units, y-axis) as a function of the temperature (° C., x-axis) of the compositions F and G.

The rheological behaviour of compositions F and G was studied in the case of a temperature range from 50 to 100° C. The results are shown in FIG. 10. It is observed that the poly(styrene-alkyldiol methacrylate) copolymer A1-5 and the poly(styrene-phenylboronic ester styrene) copolymer A2-3 make it possible to compensate for the reduction in viscosity of the tetralin when the temperature increases.

The invention claimed is:

1. A composition resulting from a mixture comprising at least:
   (a) a statistical copolymer A1 resulting from the copolymerization:
   of at least one first monomer M1 of general formula (I):

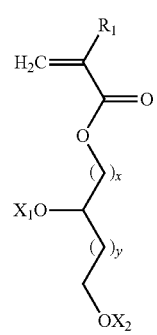

in which:
   $R_1$ is selected from a group formed by —H, —CH$_3$, and —CH$_2$—CH$_3$;
   x is an integer ranging from 2 to 18;
   y is an integer equal to 0 or 1;

$X_1$ and $X_2$, identical or different, are selected from a group formed by hydrogen, tetrahydropyranyl, methyloxymethyl, ter-butyl, benzyl, trimethylsilyl and t-butyl dimethylsilyl;

or $X_1$ and $X_2$ form with the oxygen atoms a bridge of a following formula

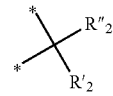

in which:
   the stars (*) symbolize the bonds to the oxygen atoms;
   $R'_2$ and $R''_2$, identical or different, are selected from a group formed by hydrogen and a $C_1$-$C_{11}$ alkyl;

or $X_1$ and $X_2$ form with the oxygen atoms a boronic ester of the following formula

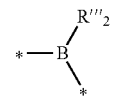

in which:
   the stars (*) symbolize the bonds to the oxygen atoms,
   $R'''_2$ is selected from a group formed by a $C_6$-$C_{18}$ aryl, a $C_7$-$C_{18}$ aralkyl and $C_2$-$C_{18}$ alkyl;
   with at least one second monomer M2 of general formula (II):

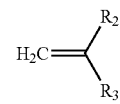

in which:
   $R_2$ is selected from a group formed by —H, —CH$_3$ and —CH$_2$—CH$_3$;
   $R_3$ is selected from a group formed by a $C_6$-$C_{18}$ aryl, a $C_6$-$C_{18}$ aryl substituted by an $R'_3$, —C(O)—O—$R'_3$; —O—$R'_3$, —S—$R'_3$ and —C(O)—N(H)—$R'_3$ group with $R'_3$ a $C_1$-$C_{30}$ alkyl group; and
   (b) a compound A2 comprising at least two boronic ester functions.

2. The composition according to claim 1, in which the statistical copolymer A1 results from the copolymerization of at least one monomer M1 with at least two monomers M2 having different R3 groups.

3. The composition according to claim 2, in which one of the monomers M2 has the general formula (II-A):

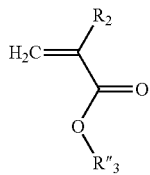

(II-A)

in which:
R$_2$ is selected from a group formed by —H, —CH$_3$ and —CH$_2$—CH$_3$;
R''$_3$ is a C$_1$-C$_{14}$ alkyl group;
and the other monomer M2 has a general formula (II-B):

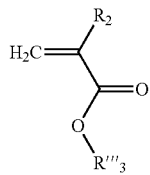

(II-B)

in which:
R$_2$ is selected from a group formed by —H, —CH$_3$ and —CH$_2$—CH$_3$; and
R'''$_3$ is a C$_{15}$-C$_{30}$ alkyl group.

4. The composition according to claim 1, in which the side chains of the statistical copolymer A1 have an average length ranging from 8 to 20 carbon atoms.

5. The composition according to claim 1, in which the statistical copolymer A1 has a molar percentage of monomer M1 of formula (I) in the copolymer ranging from 1 to 30.

6. The composition according to 1, in which the statistical copolymer A1 has a number-average degree of polymerization ranging from 100 to 2000.

7. The composition according to claim 1, in which the statistical copolymer A1 has a polydispersity index (PDI) ranging from 1.05 to 3.75.

8. The composition according to claim 1, in which the compound A2 is a compound of formula (III):

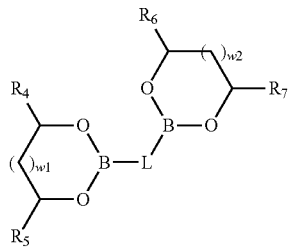

III in which:
w$_1$ and w$_2$, identical or different are integers selected between 0 and 1;
R$_4$, R$_5$, R$_6$ and R$_7$, identical or different are selected from a group formed by hydrogen and a hydrocarbon-containing group having from 1 to 24 carbon atoms; and
L is a divalent bond group and selected from a group formed by a C$_8$-C$_{18}$ aryl, a C$_6$-C$_{18}$ aralkyl and a C$_2$-C$_{24}$ hydrocarbon-containing chain.

9. The composition according to claim 1, in which the compound A2 is a statistical copolymer resulting from the copolymerization
of at least one monomer M3 of formula (IV):

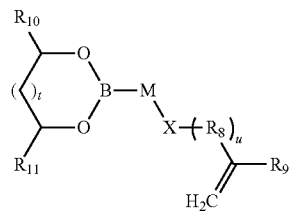

(IV)

in which:
t is an integer equal to 0 or 1;
u is an integer equal to 0 or 1;
M and R$_8$ are divalent bond groups, identical or different, selected from a group formed by a C$_6$-C$_{18}$ aryl, a C$_7$-C$_{24}$ aralkyl and a C$_2$-C$_{24}$ alkyl;
X is a function selected from a group formed by —O—C(O)—, —C(O)—O—, —C(O)—N(H)—, —N(H)—C(O)—, —S—, —N(H)—, —N(R'$_4$)— and —O— with R'$_4$ a hydrocarbon-containing chain comprising from 1 to 15 carbon atoms;
R$_9$ is selected from a group formed by —H, —CH$_3$ and —CH$_2$—CH$_3$;
R$_{10}$ and R$_{11}$ identical or different are selected from a group formed by hydrogen and a hydrocarbon-containing group having from 1 to 24 carbon atoms;
with at least one second monomer M4 of general formula (V):

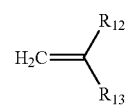

(V)

in which:
R$_{12}$ is selected from a group formed by —H, —CH$_3$ and —CH$_2$—CH$_3$; and
R$_{13}$ is selected from a group formed by a C$_6$-C$_{18}$ aryl, a C$_6$-C$_{18}$ aryl substituted by an R'$_{13}$, —C(O)—O—R'$_{13}$; —O—R'$_{13}$, —S—R'$_{13}$ and —C(O)—N(H)—R'$_{13}$ group with R'$_{13}$ a C$_1$-C$_{25}$ alkyl group.

10. The composition according to claim 9, in which the chain formed by the sequence of the R$_{10}$, M, X and (R$_8$)$_u$ groups with u equal to 0 or 1 of the monomer of general formula (IV) has a total number of carbon atoms ranging from 8 to 38.

11. The composition according to claim 9, in which the side chains of the copolymer A2 have an average length greater than or equal to 8 carbon atoms.

12. The composition according to claim 9, in which the copolymer A2 has a molar percentage of monomer of formula (IV) in the copolymer ranging from 0.25 to 20%.

13. The composition according to claim 9, in which the copolymer A2 has a number-average degree of polymerization ranging from 50 to 1500.

14. The composition according to claim 9, in which the copolymer A2 has a polydispersity index (PDI) ranging from 1.04 to 3.54.

15. The composition according to claim 1, in which the copolymer A1 content ranges from 0.1% to 50% by weight with respect to the total weight of the composition.

16. The composition according to claim 1, in which the compound A2 content ranges from 0.1% to 50% by weight with respect to the total weight of the composition.

17. The composition according to claim 1, in which the ratio by weight between the copolymer A1 and the compound A2 (ratio A1/A2) ranges from 0.005 to 200.

18. The composition according to claim 1 further comprising at least one additive selected from a group formed by the polymers, pigments, dyes, fillers, plasticizers, fibres, antioxidants, additives for lubricants, compatibilizing agents, anti-foaming agents, dispersant additives, adhesion promoters and stabilizing agents.

19. A composition comprising:
a base oil;
a copolymer composition resulting from a mixture comprising at least:
(a) a statistical copolymer A1 resulting from the copolymerization:
of at least one first monomer M1 of general formula (I):

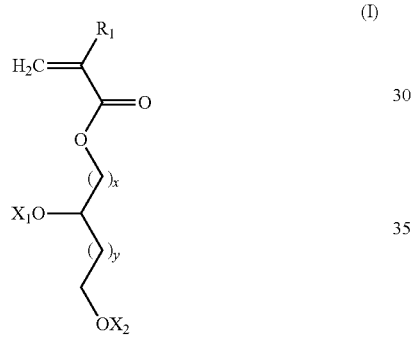

in which:
$R_1$ is selected from a group formed by —H, —$CH_3$, and —$CH_2$—$CH_3$;
x is an integer ranging from 2 to 18;
y is an integer equal to 0 or 1;
$X_1$ and $X_2$, identical or different, are selected from a group formed by hydrogen, tetrahydropyranyl, methyloxymethyl, ter-butyl, benzyl, trimethylsilyl and t-butyl dimethylsilyl;
or
$X_1$ and $X_2$ form with the oxygen atoms a bridge of a following formula

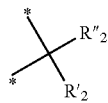

in which:
the stars (*) symbolize the bonds to the oxygen atoms;
$R'_2$ and $R''_2$, identical or different, are selected from a group formed by hydrogen and a $C_1$-$C_{11}$ alkyl;

or
$X_1$ and $X_2$ form with the oxygen atoms a boronic ester of the following formula

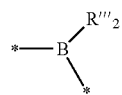

in which:
the stars (*) symbolize the bonds to the oxygen atoms,
$R'''_2$ is selected from a group formed by a $C_6$-$C_{18}$ aryl, a $C_7$-$C_{18}$ aralkyl and $C_2$-$C_{18}$ alkyl;
with at least one second monomer M2 of general formula (II):

in which:
$R_2$ is selected from a group formed by —H, —$CH_3$ and —$CH_2$—$CH_3$;
$R_3$ is selected from a group formed by a $C_6$-$C_{18}$ aryl, a $C_6$-$C_{18}$ aryl substituted by an $R'_3$, —C(O)—O—$R'_3$; —O—$R'_3$, —S—$R'_3$ and —C(O)—N(H)—$R'_3$ group with $R'_3$ a $C_1$-$C_{30}$ alkyl group; and
(b) a compound A2 of formula (III):

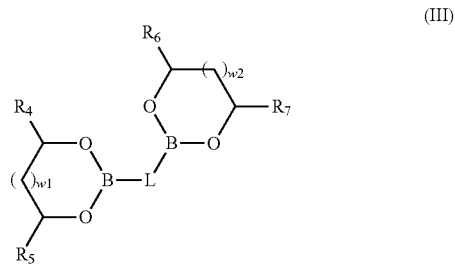

in which:
$w_1$ and $w_2$, being identical or different, are integers selected between 0 and 1;
$R_4$, $R_5$, $R_6$ and $R_7$, being identical or different, are selected from a group formed by hydrogen and a hydrocarbon-containing group having from 1 to 24 carbon atoms; and
L is a divalent bond group and selected from a group formed by a $C_6$-$C_{18}$ aryl, a $C_6$-$C_{18}$ aralkyl and a $C_2$-$C_{24}$ hydrocarbon-containing chain; and
an additive selected from the group consisting of thermoplastics, elastomers, thermoplastic elastomers, thermosetting polymers, pigments, dyes, fillers, plasticizers, fibres, antioxidants, additives for lubricants, compatibilizing agents, anti-foaming agents, dispersant additives, adhesion promoters, stabilizing agents, and combinations thereof, wherein a ratio by weight between the copolymer A1 and the compound A2 (ratio A1/A2) ranges from 0.05 to 20, and wherein the copolymer composition causes the base oil to thicken as a temperature of the base oil increases.

20. A method of controlling a viscosity of a lubricant, the method comprising:

adding a polymer composition to the lubricant, wherein the polymer composition results form a mixture comprising:

(a) a statistical copolymer A1 resulting from the copolymerization:

of at least one first monomer M1 of general formula (I):

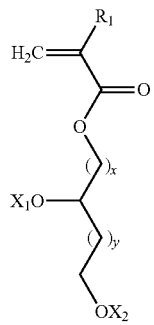

(I)

in which:

$R_1$ is selected from a group formed by —H, —$CH_3$, and —$CH_2$—$CH_3$;

x is an integer ranging from 2 to 18;

y is an integer equal to 0 or 1;

$X_1$ and $X_2$, identical or different, are selected from a group formed by hydrogen, tetrahydropyranyl, methyloxymethyl, ter-butyl, benzyl, trimethylsilyl and t-butyl dimethylsilyl;

or $X_1$ and $X_2$ form with the oxygen atoms a bridge of a following formula

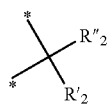

in which:

the stars (*) symbolize the bonds to the oxygen atoms;

$R'_2$ and $R''_2$, identical or different, are selected from a group formed by hydrogen and a $C_1$-$C_{11}$ alkyl;

or $X_1$ and $X_2$ form with the oxygen atoms a boronic ester of the following formula

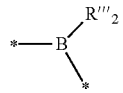

in which:

the stars (*) symbolize the bonds to the oxygen atoms, $R'''_2$ is selected from a group formed by a $C_6$-$C_{18}$ aryl, a $C_7$-$C_{18}$ aralkyl and $C_2$-$C_{18}$ alkyl;

with at least one second monomer M2 of general formula (II):

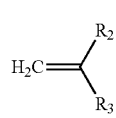

(II)

in which:

$R_2$ is selected from a group formed by —H, —$CH_3$ and —$CH_2$—$CH_3$;

$R_3$ is selected from a group formed by a $C_6$-$C_{18}$ aryl, a $C_6$-$C_{18}$ aryl substituted by an $R'_3$, —C(O)—O—$R'_3$; —O—$R'_3$, —S—$R'_3$ and —C(O)—N(H)—$R'_3$ group with $R'_3$ a $C_1$-$C_{30}$ alkyl group; and (b) a compound A2 comprising at least two boronic ester functions, wherein the polymer composition increases a viscosity of the lubricant as a temperature of the lubricant increases.

* * * * *